US009789605B2

(12) United States Patent
Meier et al.

(10) Patent No.: US 9,789,605 B2
(45) Date of Patent: Oct. 17, 2017

(54) APPARATUS AND METHODS FOR CONTROL OF ROBOT ACTIONS BASED ON CORRECTIVE USER INPUTS

(71) Applicant: Brain Corporation, San Diego, CA (US)

(72) Inventors: Philip Meier, San Diego, CA (US); Jean-Baptiste Passot, Solana Beach, CA (US); Borja Ibarz Gabardos, La Jolla, CA (US); Patryk Laurent, San Diego, CA (US); Oleg Sinyavskiy, San Diego, CA (US); Peter O'Connor, San Diego, CA (US); Eugene Izhikevich, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 0 days.

(21) Appl. No.: 15/174,858

(22) Filed: Jun. 6, 2016

(65) Prior Publication Data

US 2016/0279790 A1 Sep. 29, 2016

Related U.S. Application Data

(63) Continuation of application No. 14/171,762, filed on Feb. 3, 2014, now Pat. No. 9,358,685.

(51) Int. Cl.
*G05B 19/04* (2006.01)
*B25J 9/16* (2006.01)
(Continued)

(52) U.S. Cl.
CPC .............. *B25J 9/163* (2013.01); *B25J 9/161* (2013.01); *B25J 9/1602* (2013.01); *B25J 9/1656* (2013.01);
(Continued)

(58) Field of Classification Search
CPC combination set(s) only.
See application file for complete search history.

(56) References Cited

U.S. PATENT DOCUMENTS 3,920,972 A 11/1975 Corwin, Jr. et al.
4,468,617 A 8/1984 Ringwall
(Continued)

FOREIGN PATENT DOCUMENTS

CN 102226740 A 10/2011
EP 2384863 A2 11/2011
(Continued)

OTHER PUBLICATIONS

Abbott L. F. and Nelson S.B. (2000), "Synaptic plasticity: taming the beast", Nature Neuroscience, 3, 1178-1183.
(Continued)

*Primary Examiner* — Jonathan L Sample
(74) *Attorney, Agent, or Firm* — Gazdzinski & Associates, PC

(57) ABSTRACT

Robots have the capacity to perform a broad range of useful tasks, such as factory automation, cleaning, delivery, assistive care, environmental monitoring and entertainment. Enabling a robot to perform a new task in a new environment typically requires a large amount of new software to be written, often by a team of experts. It would be valuable if future technology could empower people, who may have limited or no understanding of software coding, to train robots to perform custom tasks. Some implementations of the present invention provide methods and systems that respond to users' corrective commands to generate and refine a policy for determining appropriate actions based on sensor-data input. Upon completion of learning, the system
(Continued)

can generate control commands by deriving them from the sensory data. Using the learned control policy, the robot can behave autonomously.

21 Claims, 9 Drawing Sheets

(51) Int. Cl.
 *G06N 99/00* (2010.01)
 *G06N 3/00* (2006.01)
 *G05D 1/00* (2006.01)

(52) U.S. Cl.
 CPC ......... *G05D 1/0033* (2013.01); *G05D 1/0088* (2013.01); *G06N 3/008* (2013.01); *G06N 99/005* (2013.01); *G05B 2219/40116* (2013.01); *G05D 2201/02* (2013.01); *Y10S 901/01* (2013.01); *Y10S 901/46* (2013.01)

(56) References Cited

U.S. PATENT DOCUMENTS

| | | | |
|---|---|---|---|
| 4,617,502 A | 10/1986 | Sakaue et al. | |
| 4,638,445 A * | 1/1987 | Mattaboni | B25J 9/0003 180/168 |
| 4,706,204 A | 11/1987 | Hattori | |
| 4,763,276 A | 8/1988 | Perreirra et al. | |
| 4,852,018 A | 7/1989 | Grossberg et al. | |
| 5,063,603 A | 11/1991 | Burt | |
| 5,092,343 A | 3/1992 | Spitzer et al. | |
| 5,121,497 A * | 6/1992 | Kerr | G06F 13/107 719/328 |
| 5,245,672 A | 9/1993 | Wilson et al. | |
| 5,303,384 A | 4/1994 | Rodriguez et al. | |
| 5,355,435 A | 10/1994 | DeYong et al. | |
| 5,388,186 A | 2/1995 | Bose | |
| 5,408,588 A | 4/1995 | Ulug | |
| 5,467,428 A | 11/1995 | Ulug | |
| 5,579,440 A | 11/1996 | Brown | |
| 5,602,761 A | 2/1997 | Spoerre et al. | |
| 5,612,883 A | 3/1997 | Shaffer et al. | |
| 5,638,359 A | 6/1997 | Peltola et al. | |
| 5,673,367 A | 9/1997 | Buckley | |
| 5,687,294 A | 11/1997 | Jeong | |
| 5,719,480 A * | 2/1998 | Bock | G05B 13/027 318/561 |
| 5,739,811 A | 4/1998 | Rosenberg et al. | |
| 5,841,959 A | 11/1998 | Guiremand | |
| 5,875,108 A | 2/1999 | Hoffberg et al. | |
| 5,994,864 A * | 11/1999 | Inoue | B25J 9/1633 318/568.2 |
| 6,009,418 A | 12/1999 | Cooper | |
| 6,014,653 A | 1/2000 | Thaler | |
| 6,169,981 B1 * | 1/2001 | Werbos | G05B 13/0265 706/15 |
| 6,218,802 B1 | 4/2001 | Onoue et al. | |
| 6,243,622 B1 | 6/2001 | Yim et al. | |
| 6,259,988 B1 | 7/2001 | Galkowski et al. | |
| 6,272,479 B1 | 8/2001 | Farry et al. | |
| 6,363,369 B1 | 3/2002 | Liaw et al. | |
| 6,366,293 B1 | 4/2002 | Hamilton et al. | |
| 6,442,451 B1 | 8/2002 | Lapham | |
| 6,458,157 B1 | 10/2002 | Suaning | |
| 6,489,741 B1 | 12/2002 | Genov et al. | |
| 6,493,686 B1 | 12/2002 | Francone et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,581,046 B1 | 6/2003 | Ahissar | |
| 6,601,049 B1 | 7/2003 | Cooper | |
| 6,636,781 B1 | 10/2003 | Shen et al. | |
| 6,643,627 B2 | 11/2003 | Liaw et al. | |
| 6,697,711 B2 | 2/2004 | Yokono et al. | |
| 6,703,550 B2 | 3/2004 | Chu | |
| 6,760,645 B2 | 7/2004 | Kaplan et al. | |
| 6,961,060 B1 * | 11/2005 | Mochizuki | A63F 13/12 345/473 |
| 7,002,585 B1 | 2/2006 | Watanabe et al. | |
| 7,024,276 B2 | 4/2006 | Ito | |
| 7,243,334 B1 | 7/2007 | Berger et al. | |
| 7,324,870 B2 | 1/2008 | Lee et al. | |
| 7,342,589 B2 | 3/2008 | Miserocchi | |
| 7,395,251 B2 | 7/2008 | Linsker | |
| 7,398,259 B2 | 7/2008 | Nugent | |
| 7,426,501 B2 | 9/2008 | Nugent | |
| 7,426,920 B1 | 9/2008 | Petersen | |
| 7,668,605 B2 | 2/2010 | Braun et al. | |
| 7,672,920 B2 | 3/2010 | Ito et al. | |
| 7,752,544 B2 | 7/2010 | Cheng et al. | |
| 7,849,030 B2 | 12/2010 | Ellingsworth | |
| 8,015,130 B2 | 9/2011 | Matsugu et al. | |
| 8,145,355 B2 | 3/2012 | Danko | |
| 8,214,062 B2 | 7/2012 | Eguchi et al. | |
| 8,271,134 B2 | 9/2012 | Kato et al. | |
| 8,315,305 B2 | 11/2012 | Petre et al. | |
| 8,364,314 B2 | 1/2013 | Abdallah et al. | |
| 8,380,652 B1 | 2/2013 | Francis, Jr. | |
| 8,419,804 B2 * | 4/2013 | Herr | A61F 2/60 623/24 |
| 8,452,448 B2 | 5/2013 | Pack et al. | |
| 8,467,623 B2 | 6/2013 | Izhikevich et al. | |
| 8,509,951 B2 | 8/2013 | Gienger | |
| 8,571,706 B2 | 10/2013 | Zhang et al. | |
| 8,639,644 B1 | 1/2014 | Hickman et al. | |
| 8,655,815 B2 | 2/2014 | Palmer et al. | |
| 8,751,042 B2 | 6/2014 | Lee et al. | |
| 8,793,205 B1 | 7/2014 | Fisher et al. | |
| 8,924,021 B2 * | 12/2014 | Dariush | G06N 3/008 700/245 |
| 8,958,912 B2 * | 2/2015 | Blumberg | B25J 9/0087 700/259 |
| 8,972,315 B2 | 3/2015 | Szatmary et al. | |
| 8,990,133 B1 | 3/2015 | Ponulak et al. | |
| 9,008,840 B1 | 4/2015 | Ponulak et al. | |
| 9,015,092 B2 | 4/2015 | Sinyavskiy et al. | |
| 9,015,093 B1 | 4/2015 | Commons | |
| 9,047,568 B1 | 6/2015 | Fisher et al. | |
| 9,056,396 B1 | 6/2015 | Linnell | |
| 9,070,039 B2 | 6/2015 | Richert | |
| 9,082,079 B1 | 7/2015 | Coenen | |
| 9,104,186 B2 | 8/2015 | Sinyavskiy et al. | |
| 9,122,994 B2 | 9/2015 | Piekniewski et al. | |
| 9,144,907 B2 * | 9/2015 | Summer | B25J 9/1689 |
| 9,177,245 B2 | 11/2015 | Richert et al. | |
| 9,186,793 B1 | 11/2015 | Meier | |
| 9,189,730 B1 | 11/2015 | Coenen et al. | |
| 9,193,075 B1 | 11/2015 | Cipollini et al. | |
| 9,195,934 B1 | 11/2015 | Hunt et al. | |
| 9,213,937 B2 | 12/2015 | Ponulak | |
| 9,242,372 B2 | 1/2016 | Laurent et al. | |
| 9,314,924 B1 * | 4/2016 | Laurent | B25J 9/163 |
| 2001/0045809 A1 | 11/2001 | Mukai | |
| 2002/0038294 A1 | 3/2002 | Matsugu | |
| 2002/0103576 A1 | 8/2002 | Takamura et al. | |
| 2002/0158599 A1 | 10/2002 | Fujita et al. | |
| 2002/0169733 A1 | 11/2002 | Peters et al. | |
| 2002/0175894 A1 | 11/2002 | Grillo | |
| 2002/0198854 A1 | 12/2002 | Berenji et al. | |
| 2003/0023347 A1 | 1/2003 | Konno et al. | |
| 2003/0050903 A1 | 3/2003 | Liaw et al. | |
| 2003/0108415 A1 * | 6/2003 | Hosek | B25J 9/1664 414/783 |
| 2003/0144764 A1 | 7/2003 | Yokono et al. | |
| 2003/0220714 A1 * | 11/2003 | Nakamura | B25J 9/1633 700/245 |
| 2004/0030449 A1 * | 2/2004 | Solomon | B64C 39/024 700/245 |
| 2004/0036437 A1 | 2/2004 | Ito | |
| 2004/0051493 A1 | 3/2004 | Furuta et al. | |
| 2004/0128028 A1 | 7/2004 | Miyamoto et al. | |
| 2004/0131998 A1 | 7/2004 | Marom et al. | |
| 2004/0136439 A1 | 7/2004 | Dewberry et al. | |

(56) References Cited

U.S. PATENT DOCUMENTS

| | | |
|---|---|---|
| 2004/0158358 A1 | 8/2004 | Anezaki et al. |
| 2004/0162638 A1 | 8/2004 | Solomon |
| 2004/0167641 A1* | 8/2004 | Kawai .................. A61B 5/1038 |
| | | 700/63 |
| 2004/0172168 A1* | 9/2004 | Watanabe ............. B25J 9/1664 |
| | | 700/264 |
| 2004/0193670 A1 | 9/2004 | Langan et al. |
| 2004/0267404 A1* | 12/2004 | Danko .................. B25J 9/1607 |
| | | 700/245 |
| 2005/0004710 A1 | 1/2005 | Shimomura et al. |
| 2005/0008227 A1 | 1/2005 | Duan et al. |
| 2005/0015351 A1 | 1/2005 | Nugent |
| 2005/0036649 A1 | 2/2005 | Yokono et al. |
| 2005/0049749 A1 | 3/2005 | Watanabe et al. |
| 2005/0054381 A1* | 3/2005 | Lee ........................ G06F 3/011 |
| | | 455/557 |
| 2005/0065651 A1 | 3/2005 | Ayers et al. |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1 | 6/2005 | Mikami et al. |
| 2005/0283450 A1 | 12/2005 | Matsugu et al. |
| 2006/0069448 A1 | 3/2006 | Yasui |
| 2006/0082340 A1 | 4/2006 | Watanabe et al. |
| 2006/0094001 A1 | 5/2006 | Torre et al. |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Brogardh et al. |
| 2006/0189900 A1 | 8/2006 | Flaherty et al. |
| 2006/0207419 A1* | 9/2006 | Okazaki .................. B25J 9/142 |
| | | 91/35 |
| 2006/0230140 A1 | 10/2006 | Aoyama et al. |
| 2006/0250101 A1* | 11/2006 | Khatib .................. B25J 9/1633 |
| | | 318/568.2 |
| 2007/0022068 A1 | 1/2007 | Linsker |
| 2007/0074177 A1* | 3/2007 | Kurita ........................ G06F 8/75 |
| | | 717/131 |
| 2007/0100780 A1 | 5/2007 | Fleischer et al. |
| 2007/0112700 A1 | 5/2007 | Den Haan et al. |
| 2007/0151389 A1* | 7/2007 | Prisco .................... B25J 9/1633 |
| | | 74/490.05 |
| 2007/0176643 A1 | 8/2007 | Nugent |
| 2007/0200525 A1* | 8/2007 | Kanaoka ............. G05D 1/0875 |
| | | 318/568.21 |
| 2007/0208678 A1 | 9/2007 | Matsugu |
| 2007/0250464 A1 | 10/2007 | Hamilton |
| 2007/0255454 A1* | 11/2007 | Dariush .................. G06N 3/008 |
| | | 700/245 |
| 2007/0260356 A1 | 11/2007 | Kock et al. |
| 2008/0024345 A1 | 1/2008 | Watson |
| 2008/0040040 A1 | 2/2008 | Goto et al. |
| 2008/0097644 A1 | 4/2008 | Kaznov et al. |
| 2008/0100482 A1 | 5/2008 | Lazar |
| 2008/0112596 A1 | 5/2008 | Rhoads et al. |
| 2008/0114710 A1* | 5/2008 | Pucher ................... G06N 99/005 |
| | | 706/20 |
| 2008/0133052 A1 | 6/2008 | Jones et al. |
| 2008/0140257 A1* | 6/2008 | Sato ........................ B25J 9/1633 |
| | | 700/258 |
| 2008/0154428 A1 | 6/2008 | Nagatsuka et al. |
| 2008/0162391 A1 | 7/2008 | Izhikevich |
| 2008/0294074 A1 | 11/2008 | Tong et al. |
| 2008/0319929 A1* | 12/2008 | Kaplan .................. G06N 3/004 |
| | | 706/14 |
| 2009/0037033 A1 | 2/2009 | Phillips et al. |
| 2009/0037351 A1 | 2/2009 | Kristal et al. |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1* | 11/2009 | Nagasaka ............... B25J 9/1633 |
| | | 180/8.6 |
| 2009/0287624 A1 | 11/2009 | Rouat et al. |
| 2009/0299751 A1 | 12/2009 | Jung |
| 2009/0312817 A1 | 12/2009 | Hogle et al. |
| 2010/0036457 A1 | 2/2010 | Sarpeshkar et al. |
| 2010/0081958 A1 | 4/2010 | She |
| 2010/0086171 A1 | 4/2010 | Lapstun |
| 2010/0119214 A1 | 5/2010 | Shimazaki et al. |
| 2010/0152896 A1* | 6/2010 | Komatsu ............... B25J 9/0003 |
| | | 700/258 |
| 2010/0152899 A1* | 6/2010 | Chang ..................... B25J 9/162 |
| | | 700/262 |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger et al. |
| 2010/0225824 A1 | 9/2010 | Lazar et al. |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada et al. |
| 2010/0305758 A1* | 12/2010 | Nishi ...................... B23Q 17/00 |
| | | 700/264 |
| 2010/0312730 A1 | 12/2010 | Weng et al. |
| 2011/0010006 A1 | 1/2011 | Tani et al. |
| 2011/0016071 A1 | 1/2011 | Guillen et al. |
| 2011/0026770 A1 | 2/2011 | Brookshire |
| 2011/0035052 A1 | 2/2011 | McLurkin et al. |
| 2011/0035188 A1 | 2/2011 | Martinez-Heras et al. |
| 2011/0040405 A1 | 2/2011 | Lim et al. |
| 2011/0060460 A1* | 3/2011 | Oga ........................ B25J 9/1633 |
| | | 700/254 |
| 2011/0060461 A1 | 3/2011 | Velliste et al. |
| 2011/0067479 A1* | 3/2011 | Davis ...................... B25J 9/1692 |
| | | 73/1.75 |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch et al. |
| 2011/0119215 A1 | 5/2011 | Elmegreen et al. |
| 2011/0144802 A1 | 6/2011 | Jang |
| 2011/0158476 A1 | 6/2011 | Fahn et al. |
| 2011/0160741 A1 | 6/2011 | Asano et al. |
| 2011/0160906 A1* | 6/2011 | Orita ...................... B62D 57/032 |
| | | 700/260 |
| 2011/0160907 A1* | 6/2011 | Orita ...................... B25J 9/1607 |
| | | 700/260 |
| 2011/0196199 A1 | 8/2011 | Donhowe et al. |
| 2011/0208350 A1 | 8/2011 | Eliuk et al. |
| 2011/0218676 A1* | 9/2011 | Okazaki ................ B25J 9/1075 |
| | | 700/260 |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter et al. |
| 2011/0319714 A1 | 12/2011 | Roelle et al. |
| 2012/0008838 A1 | 1/2012 | Guyon et al. |
| 2012/0011090 A1 | 1/2012 | Tang et al. |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1 | 2/2012 | Kim et al. |
| 2012/0053728 A1 | 3/2012 | Theodorus et al. |
| 2012/0071752 A1 | 3/2012 | Sewell et al. |
| 2012/0079670 A1 | 4/2012 | Yoon et al. |
| 2012/0109866 A1 | 5/2012 | Modha |
| 2012/0143495 A1 | 6/2012 | Dantu |
| 2012/0144242 A1* | 6/2012 | Vichare ............... G06F 11/0751 |
| | | 714/39 |
| 2012/0150777 A1* | 6/2012 | Setoguchi ............ G06N 99/005 |
| | | 706/14 |
| 2012/0150781 A1 | 6/2012 | Arthur et al. |
| 2012/0173021 A1 | 7/2012 | Tsusaka |
| 2012/0185092 A1 | 7/2012 | Ku |

(56) References Cited

U.S. PATENT DOCUMENTS

| | | | |
|---|---|---|---|
| 2012/0197439 A1* | 8/2012 | Wang | B25J 9/1689 700/259 |
| 2012/0209428 A1 | 8/2012 | Mizutani | |
| 2012/0209432 A1 | 8/2012 | Fleischer et al. | |
| 2012/0221147 A1 | 8/2012 | Goldberg et al. | |
| 2012/0268580 A1* | 10/2012 | Kim | G06F 3/017 348/77 |
| 2012/0296471 A1 | 11/2012 | Inaba et al. | |
| 2012/0303091 A1 | 11/2012 | Izhikevich | |
| 2012/0303160 A1 | 11/2012 | Ziegler et al. | |
| 2012/0308076 A1 | 12/2012 | Piekniewski et al. | |
| 2012/0308136 A1 | 12/2012 | Izhikevich et al. | |
| 2013/0000480 A1* | 1/2013 | Komatsu | B25J 9/1615 92/48 |
| 2013/0006468 A1 | 1/2013 | Koehrsen et al. | |
| 2013/0019325 A1 | 1/2013 | Deisseroth et al. | |
| 2013/0066468 A1 | 3/2013 | Choi et al. | |
| 2013/0073080 A1 | 3/2013 | Ponulak | |
| 2013/0073484 A1 | 3/2013 | Izhikevich et al. | |
| 2013/0073491 A1 | 3/2013 | Izhikevich et al. | |
| 2013/0073492 A1 | 3/2013 | Izhikevich et al. | |
| 2013/0073493 A1 | 3/2013 | Modha | |
| 2013/0073495 A1 | 3/2013 | Izhikevich et al. | |
| 2013/0073496 A1 | 3/2013 | Szatmary et al. | |
| 2013/0073498 A1 | 3/2013 | Izhikevich et al. | |
| 2013/0073499 A1 | 3/2013 | Izhikevich et al. | |
| 2013/0073500 A1 | 3/2013 | Szatmary et al. | |
| 2013/0096719 A1 | 4/2013 | Sanders et al. | |
| 2013/0116827 A1 | 5/2013 | Inazumi | |
| 2013/0151442 A1 | 6/2013 | Suh et al. | |
| 2013/0151448 A1 | 6/2013 | Ponulak | |
| 2013/0151449 A1 | 6/2013 | Ponulak | |
| 2013/0151450 A1 | 6/2013 | Ponulak | |
| 2013/0172906 A1 | 7/2013 | Olson et al. | |
| 2013/0173060 A1* | 7/2013 | Yoo | B25J 9/1633 700/261 |
| 2013/0206170 A1 | 8/2013 | Svendsen et al. | |
| 2013/0218339 A1 | 8/2013 | Maisonnier et al. | |
| 2013/0218821 A1 | 8/2013 | Szatmary et al. | |
| 2013/0245829 A1* | 9/2013 | Ohta | B25J 9/1633 700/261 |
| 2013/0251278 A1 | 9/2013 | Izhikevich et al. | |
| 2013/0274924 A1 | 10/2013 | Chung et al. | |
| 2013/0278631 A1* | 10/2013 | Border | G02B 27/017 345/633 |
| 2013/0297541 A1 | 11/2013 | Piekniewski et al. | |
| 2013/0297542 A1 | 11/2013 | Piekniewski et al. | |
| 2013/0310979 A1 | 11/2013 | Herr et al. | |
| 2013/0325244 A1 | 12/2013 | Wang et al. | |
| 2013/0325766 A1 | 12/2013 | Petre et al. | |
| 2013/0325768 A1 | 12/2013 | Sinyavskiy et al. | |
| 2013/0325773 A1 | 12/2013 | Sinyavskiy et al. | |
| 2013/0325774 A1 | 12/2013 | Sinyavskiy et al. | |
| 2013/0325775 A1 | 12/2013 | Sinyavskiy et al. | |
| 2013/0325776 A1 | 12/2013 | Ponulak et al. | |
| 2013/0325777 A1 | 12/2013 | Petre et al. | |
| 2013/0345718 A1 | 12/2013 | Crawford et al. | |
| 2013/0346347 A1 | 12/2013 | Patterson et al. | |
| 2014/0012788 A1 | 1/2014 | Piekniewski | |
| 2014/0016858 A1 | 1/2014 | Richert | |
| 2014/0025613 A1 | 1/2014 | Ponulak | |
| 2014/0027718 A1 | 1/2014 | Zhao | |
| 2014/0032458 A1 | 1/2014 | Sinyavskiy et al. | |
| 2014/0032459 A1 | 1/2014 | Sinyavskiy et al. | |
| 2014/0052679 A1 | 2/2014 | Sinyavskiy et al. | |
| 2014/0081895 A1 | 3/2014 | Coenen et al. | |
| 2014/0089232 A1 | 3/2014 | Buibas et al. | |
| 2014/0114479 A1* | 4/2014 | Okazaki | B25J 13/085 700/253 |
| 2014/0122397 A1 | 5/2014 | Richert et al. | |
| 2014/0122398 A1 | 5/2014 | Richert | |
| 2014/0156574 A1 | 6/2014 | Piekniewski et al. | |
| 2014/0163729 A1 | 6/2014 | Shi et al. | |
| 2014/0187519 A1 | 7/2014 | Cooke et al. | |
| 2014/0193066 A1 | 7/2014 | Richert | |
| 2014/0222739 A1 | 8/2014 | Ponulak | |
| 2014/0229411 A1 | 8/2014 | Richert et al. | |
| 2014/0244557 A1 | 8/2014 | Piekniewski et al. | |
| 2014/0277718 A1 | 9/2014 | Izhikevich et al. | |
| 2014/0277744 A1 | 9/2014 | Coenen | |
| 2014/0298212 A1 | 10/2014 | Wen | |
| 2014/0309659 A1 | 10/2014 | Roh et al. | |
| 2014/0350723 A1 | 11/2014 | Prieto et al. | |
| 2014/0358284 A1 | 12/2014 | Laurent et al. | |
| 2014/0358828 A1 | 12/2014 | Phillipps et al. | |
| 2014/0369558 A1 | 12/2014 | Holz | |
| 2014/0371907 A1* | 12/2014 | Passot | G06N 3/008 700/257 |
| 2014/0371912 A1 | 12/2014 | Passot et al. | |
| 2015/0032258 A1 | 1/2015 | Passot et al. | |
| 2015/0066479 A1 | 3/2015 | Pasupalak et al. | |
| 2015/0094850 A1 | 4/2015 | Passot et al. | |
| 2015/0094852 A1 | 4/2015 | Laurent et al. | |
| 2015/0120128 A1 | 4/2015 | Rosenstein et al. | |
| 2015/0127149 A1 | 5/2015 | Sinyavskiy et al. | |
| 2015/0127154 A1 | 5/2015 | Passot et al. | |
| 2015/0127155 A1 | 5/2015 | Passot et al. | |
| 2015/0148956 A1 | 5/2015 | Negishi | |
| 2015/0185027 A1 | 7/2015 | Kikkeri et al. | |
| 2015/0204559 A1 | 7/2015 | Hoffberg et al. | |
| 2015/0217449 A1* | 8/2015 | Meier | B25J 9/1602 700/257 |
| 2015/0283701 A1 | 10/2015 | Izhikevich et al. | |
| 2015/0283702 A1 | 10/2015 | Izhikevich et al. | |
| 2015/0283703 A1 | 10/2015 | Izhikevich et al. | |
| 2015/0306761 A1 | 10/2015 | O'Connor et al. | |
| 2015/0317357 A1 | 11/2015 | Harmsen et al. | |
| 2015/0338204 A1 | 11/2015 | Richert et al. | |
| 2015/0339589 A1 | 11/2015 | Fisher | |
| 2015/0339826 A1 | 11/2015 | Buibas et al. | |
| 2015/0341633 A1 | 11/2015 | Richert | |
| 2016/0004923 A1 | 1/2016 | Piekniewski et al. | |
| 2016/0014426 A1 | 1/2016 | Richert | |

FOREIGN PATENT DOCUMENTS

| | | |
|---|---|---|
| JP | H0487423 A | 3/1992 |
| JP | 2003175480 A | 6/2003 |
| RU | 2108612 C1 | 4/1998 |
| WO | WO-2008083335 A2 | 7/2008 |
| WO | WO-2010136961 A1 | 12/2010 |
| WO | WO-2011039542 A1 | 4/2011 |
| WO | WO-2012151585 A2 | 11/2012 |

OTHER PUBLICATIONS

Alvarez, "Review of Approximation Techniques," PhD thesis, chapter 2, pp. 7-14, University of Bradford, 2000.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-pdf<http: />.

Bartlett et al., "Convexity, Classification, and Risk Bounds" Jun. 16, 2005, pp. 1-61.

Bartlett., et al., "Large Margin Classifiers: Convex Loss, Low Noise, and Convergence Rates," Dec. 8, 2003, 8 pgs.

Bohte, 'Spiking Nueral Networks' Doctorate at the University of Leiden, Holland, Mar. 5, 2003, pp. 1-133 [retrieved on Nov. 14, 2012]. Retrieved from the interne http://homepages.cwi.nl/~sbohte/publication/phdthesis.pdf<url: />.

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Branca, et al. (1995), A Neural Network for Ego-motion Estimation from Optical Flow BMC'95 Proceedings of the 1995 British conference on machine vision (vol. 1), pp. 247-256.

(56) References Cited

OTHER PUBLICATIONS

Brette et al., Brian: a simple and flexible simulator for spiking neural networks, The Neuromorphic Engineer, Jul. 1, 2009, pp. 1-4, doi: 10.2417/1200906.1659.
Cessac et al. 'Overview of facts and issues about neural coding by spikes.' Journal of Physiology, Paris 104.1 (2010): 5.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. 'Probability distributions of the logarithm of inter-spike intervals yield accurate entropy estimates from small datasets.' Journal of neuroscience methods 173.1 (2008): 129.
Fidjeland, et al., "Accelerated Simulation of Spiking Neural Networks Using GPUs," WCCI 2010 IEEE World Congress on Computational Intelligience Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.
Floreano et al., 'Neuroevolution: from architectures to learning' Evol. Intel. Jan. 2008 1:47-62, [retrieved Dec. 30, 2013] retrieved online from URL:http://inforscienee.eptl.cb/record/112676/files/FloreanoDuerrMattiussi2008.pdf<http: />.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet:< frontiersin.org />.
Gewaltig et al.. 'Nest (Neural Simulation Tool)', Scholarpedia, 2007. pp. I-15. 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al., 'Rapid neural coding in the retina with relative spike latencies.' Science 319.5866 (2008): 1108-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.
Graham, Lyle J., The Surf-Hippo Reference Manual, http://www.neurophys.biomedicale.univparis5.fr/graham/surf-hippo-files/Surf-Hippo%20Reference%20Manual.pdf, Mar. 2002. pp. 1-128.
Graham The Surf Hippo User Manual Version 3.0 B". Unite de Neurosiences Integratives et Computationnelles Institut Federatif de Neurobiologie Alfred Fessard CNRS. France. Mar. 2002 [retrieved Jan. 16, 2014]. [retrieved biomedical.univ-paris5.fr ]".
Grollman., et al., "Dogged Learning for Robots," IEEE International Conference on Robotics and Automation (ICRA), 2007.
Hatsopoulos, Visual Navigation with a Neural Network, Published 1991.
http://www.braincorporation.com/specs/13StemSpecSheet_Rev_Nov11_2013.pdf.
Huang, Fall Detection Using Modular Neural Networks with Back-projected Optical Flow, Published 2007.
<span style="color: #000000;">International Search Report and Written Opinion for Application No. PCT/US2014/026738, mailed on Jul. 21, 2014, 10 pages.
International Search Report for Application No. PCT/US2014/040407, mailed on Oct. 17, 2014, 2 pages.
Izhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jin, et al., (2010) "Implementing Spike-Timing-Dependent Plasticity on SpiNNaker Neuromorphic Hardware", WCCI 2010, IEEE World Congress on Computational Intelligence.
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: http://ncs.ethz.ch/projects/evospike/publications/evolving-spiking-neural-networks-for-spatio-and-spectro-temporal-pattern-recognition-plenary-talk-ieee-is/view.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet< URL: http://www-ee.uta.edu/eeweb/IP/Courses/SPR/Reference/Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet< URL'https://code.google.com/p/ nnql/issues/detail?id=1>.
Lazar et al. 'A video time encoding machine', in Proceedings of the 15th IEEE International Conference on Image Processing ICIP '08 2008, pp. 717-720.
Lazar, et al., "Consistent recovery of sensory stimuli encoded with MIMO neural circuits," Computational intelligence and neuroscience, 2010.
Lazar, et al., 'Multichannel time encoding with integrate-and-fire neurons.' Neurocomputing 65 (2005): 401-407.
Makridakis et al., "Evaluating Accuracy (or Error) Measures", INSEAD Technical Report, 1995/18/TM.
Masquelier, Timothee, 'Relative spike time coding and STOP-based orientation selectivity in the early visual system in natural continuous and saccadic vision: a computational model.' Journal of computational neuroscience 32.3 (2012): 425-441.
Miller III, "Real-Time Application of Neural Networks for Sensor-Based Control of Robots with Vision, IEEE Transactions on Systems, Man, and Cypernetics" Jul./Aug. 1989, vol. 19 (4), pp. 825-831.
Nguyen et al., "Estimating divergence functionals and the likelihood ratio by penalized convex risk minimization" 2007, pp. 1-8.
Nichols, A Reconfigurable Computing Architecture for Implementing Artificial Neural Networks on FPGA, Master's Thesis, The University of Guelph, 2003, pp. 1-235.
Park, et al., Transfer of Skills between Human Operators through Haptic Training with Robot Coordination. International Conference on Robotics and Automation Anchorage Convention District, Anchorage, Alaska, USA, pp. 229-235 [online], 2010 [retrieved Dec. 3, 2015]. Retrieved from the Internet.
Paugam-Moisy, et al., "Computing with Spiking Neuron Networks" Handbook of Natural Computing, 40 pages Springer, Heidelberg (2009).
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet< URL: http://citeseerx.ist.psu.edu!viewdoc/download?doi= 0.1.1.5.4346&rep—repl&type-pdf.
PCT International Search Report and Written Opinion for PCT/US2014/48512 dated Jan. 23, 2015, pp. 1-14.
Sato et al., 'Pulse interval and width modulation for video transmission.' Cable Television, IEEE Transactions on 4 (1978): 165-173.
Schemmel, J., et al., Implementing synaptic plasticity in a VLSI spiking neural network model. In: Proceedings of the 20061

(56) References Cited

OTHER PUBLICATIONS nternational Joint Conference on Neural Networks (IJCNN'06), IEEE Press (2006) Jul. 16-21, 2006, pp. 1-6 [online], [retrieved on Aug. 24, 2012]. Retrieved from the Internet< url:> Introduction</url:>.

Simulink.RTM. model [online], [Retrieved on Dec. 10, 2013] Retrieved from <:URL: http://www.mathworks.com/ products/simulink/index.html>.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Specification, figures and EFS receipt of U.S. Appl. No. 14/244,888, filed Apr. 3, 2014 and entitled "Learning apparatus and methods for control of robotic devices via spoofing" (100 pages).

Specification, figures and EFS receipt of U.S. Appl. No. 14/244,890, filed Apr. 3, 2014 and entitled "Apparatus and methods for remotely controlling robotic devices" (91 pages).

Specification, figures and EFS receipt of U.S. Appl. No. 14/244,892, filed Apr. 3, 2014 and entitled "Spoofing remote control apparatus and methods" (95 pages).

Specification, figures and EFS receipt of U.S. Appl. No. 14/265,113, filed Apr. 29, 2014 and entitled "Trainable convolutional network apparatus and methods for operating a robotic vehicle" (71 pages).

Specification, figures and EFS receipt of U.S. Appl. No. 14/285,385, filed May 22, 2014 and entitled "Apparatus and methods for real time estimation of differential motion in live video" (42 pages).

Specification, figures and EFS receipt of U.S. Appl. No. 14/285,414, filed May 22, 2014 and entitled "Apparatus and methods for distance estimation using multiple image sensors" (63 pages).

Specification, figures and EFS receipt of U.S. Appl. No. 14/285,466, filed May 22, 2014 and entitled "Apparatus and methods for robotic operation using video imagery" (64 pages).

Specification, figures and EFS receipt of U.S. Appl. No. 14/321,736, filed Jul. 1, 2014 and entitled "Optical detection apparatus and methods" (49 pages).

Specification, figures and EFS receipt of U.S. Appl. No. 14/326,374, filed Jul. 8, 2014 and entitled "Apparatus and methods for distance estimation using stereo imagery" (75 pages).

Specification, figures and EFS receipt of U.S. Appl. No. 14/489,242, filed Sep. 17, 2014 and entitled "Apparatus and methods for remotely controlling robotic devices" (100 pages).

Specification, figures and EFS receipt of U.S. Appl. No. 14/542,391, filed Nov. 14, 2014 and entitled "Feature detection apparatus and methods for training of robotic navigation" (83 pages).

Specification, figures and EFS receipt of U.S. Appl. No. 14/588,168, filed Dec. 31, 2014 and entitled—Apparatus and methods for training robots (101 pages).

Specification, figures and EFS receipt of U.S. Appl. No. 14/637,138, filed Mar. 3, 2015 and entitled "Salient features tracking apparatus and methods using visual initialization" (66 pages).

Specification, figures and EFS receipt of U.S. Appl. No. 14/637,164, filed Mar. 3, 2015 and entitled "Apparatus and methods for tracking salient features" (66 pages).

Specification, figures and EFS receipt of U.S. Appl. No. 14/637,191, filed Mar. 3, 2015 and entitled "Apparatus and methods for saliency detection based on color occurrence analysis" (66 pages).

Specification, figures and EFS receipt of U.S. Appl. No. 14/705,487, filed May 6, 2015 and entitled—Persistent predictor apparatus and methods for task switching (119 pages).

Szatmary et al., "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879<url:></url:>.

Walters, "Implementation of Self-Organizing Neural Networks for Visuo-Motor Control of an Industrial Robot," IEEE Transactions on Neural Networks, vol. 4 (1), Jan 1993, pp. 86-95.

Wang 'The time dimension for scene analysis.' Neural Networks, IEEE Transactions on 16.6 (2005): 1401-1426.

Zhou, Computation of Optical Flow Using a Neural Network, Published 1988.

\* cited by examiner

APPARATUS AND METHODS FOR CONTROL OF ROBOT ACTIONS BASED ON CORRECTIVE USER INPUTS

PRIORITY

This application is a continuation of and claims priority to co-owned and co-pending U.S. patent application Ser. No. 14/171,762 filed on Feb. 3, 2014 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present disclosure relates generally to automatically and dynamically adjusting policies for controlling robot actions based on inputs from users identifying a requested correction of a performed robot action.

Robots have the capacity to perform a broad range of useful tasks, such as factory automation, cleaning, delivery, assistive care, environmental monitoring and entertainment. Enabling a robot to perform a new task in a new environment typically requires a large amount of new software to be written, often by a team of experts. It would be valuable if future technology could empower people, who may have limited or no understanding of software coding, to train robots to perform custom tasks. This would allow individual robots to be more flexible. It would also enable a suite of custom behaviors to be available at a low price point, which were previously prohibitive due to the limited availability and high costs of robotics experts.

SUMMARY

Some implementations of the present invention provide methods and systems that respond to users' corrective commands to generate and refine a policy for determining appropriate actions based on sensor-data input. Initially the system is responsive to a users' commands via an interface, enabling direct control of a robot's actions. The system learns to associate the commands the user provides with the robot's sensory context. The learning enables the system to make a prediction of what it should do, even if the user does not issue a command. The system learns continually and progressively. During the learning process, the system issues commands which are enacted, but may be overruled or modified by the users' corrective commands. A corrective command informs the system of an action that could have been performed better. The system learns quickly because it focuses on the actions that are relevant to a given task, as well as the actions that could be most improved by the current policy. Upon completion of learning, the system can generate control commands by deriving them from the sensory data. Using the learned control policy, the robot can behave autonomously.

To provide a qualitative sense for how the system may use a corrective command, we could imagine the robot thinking, "The action I was going to take was not the best choice; rather the action indicated by the user was better." Or more generally, "Whatever I was doing when I got the last correction should be more like what the user instructed me to do." These explicit propositions need not be included anywhere within the learning algorithm, but they may facilitate the reader's understanding of the kinds of operations the system will perform to update the control policy.

Consider an implementation of the invention applied to a robot that has the task of removing leaves from a swimming pool. The robot has a camera, a leaf scoop, and the ability to move forward, backwards or turn in any direction. The task of the robot is to know what motor output to provide, given the robot's current state and the sensory information that is available from the camera. However, the appearance of a leaf may vary dramatically from one pool to the next, depending on the kind of leaf, the time of day, the color of the paint on the floor, the presence of a patterned wall, etc. The system is responsive to the users' commands, such as turning around when there are no leaves in front of it, or to accelerating and turning to the left when there is a leaf to the front and left of the robot. When the system receives these commands, it has access to the sensory input from the camera that includes the appearance of the leaf in that context, including the lighting, the background, etc. The robot then can learn the visual features that consistently predict the enacted corrected commands. By learning, the system can generate a control policy for scooping up leaves from the pool, relying entirely on the users' commands and its sensory experience. The system can learn to perform a desired task for a user without relying on additional software to be written. The system naturally prioritizes fixing the kinds of control errors that are most likely to occur because it rapidly incorporates adjustments from the user, as errors occur (e.g. to turn more sharply left right now). Consider a moment when the robot is navigating forward, and turning slowly to the left. A user may recognize that the current action generated by the control policy is mostly a sound strategy, but that the robot should turn a bit faster in order to reach the desired floating leaf. The user may provide a corrective command via the user interface, informing the system to slightly rotate the robot counter-clockwise. Not only does the system enact the corrected command, but it also changes what the robot will do in future situations. In other words, using the system we describe, a robot is able to dynamically adjust its control policy based on the corrective commands of the user.

In some implementations, the system may be present on a robot that already contains a well-defined control policy. In such a system, the control policy may work automatically (for certain tasks, in certain environments) without any user interaction. However, if the user identifies a problem, there exists a means for the user to fix it because the system is responsive to corrective commands.

One aspect of the disclosure relates to a method for controlling actions of robots, the method comprising: identifying, at a device that includes a processor, a first context-variable value for a context variable detected by a robot at a sensory-detection time; accessing, at the device, a policy that maps the context variable to a robot action variable; determining that a first robot action characterized by a first value of the robot action variable was performed at an action time in response to detection of the first context-variable value, the first robot action being in accordance with application of the policy; determining that a user input was received at an input time corresponding to the action time, wherein user input data derived from the user input at least partly defines a corrective command that specifies a corrective robot action for physical performance, and the user input being indicative of at least partial dissatisfaction with the robot action; modifying the policy based on the correction command and the context-variable value; and causing the modified policy to be used to determine a second value of the robot action variable based on a second context-variable value for the context variable detected at a second sensory-detection time; and initiate performance of a second robot action performance in accordance with the second value of the action variable.

In some implementations, the method may comprise: identifying a third context-variable value for the context variable, the third context-variable value being detected at a third sensory-detection time that is after the before the third sensory-detection time; determining that the robot performed a third action in response to the third context-variable value, the third action be in accordance with application of the accessed policy; and inferring that the third action was satisfactory based on a lack of input data at least partly defining a correction command corresponding to the third action. The modification of the policy may be based on the third context-variable value.

In some implementations, the method may comprise: identifying initial user input data derived from an initial user input received, the initial user input data at least partly defining a command that specifies an initial robot action for a robot to physically perform; identifying an initial context-variable value for a context variable detected by the robot at an initial sensory-detection time that corresponds to the initial input time; and determining the accessed policy based on the command and the first context-variable value for the context variable.

In some implementations, the method may comprise: determining the first value of the robot action variable based on the first context-variable value for the context variable; and initiating the robot action in accordance with the first value of the robot action variable.

In some implementations, the policy may be modified using a learning model.

In some implementations, the corrective action may be indicative of a magnitude of action.

In some implementations, the robot may include the device and a motor used to perform at least part of the first robot action or the second robot action.

In some implementations, the user input may include input received at an interface at a user device remote from the robot.

Another aspect of the disclosure relates to a system, comprising: one or more data processors; and a non-transitory computer readable storage medium containing instructions which when executed on the one or more data processors, cause the processor to perform operations. Those operations may include: identifying a first context-variable value for a context variable detected by a robot at a sensory-detection time; accessing a policy that maps the context variable to a robot action variable; determining that a robot action characterized by a first value of the robot action variable was performed at an action time in response to detection of the first context-variable value, the first robot action being in accordance with application of the policy; determining that a user input was received at an input time corresponding to the action time, wherein user input data derived from the user input at least partly defines a corrective command that specifies a corrective robot action for physical performance, and the user input being indicative of at least partial dissatisfaction with the robot action; modifying the policy based on the correction command and the context-variable value; and causing the modified policy to be used to determine a second value of the robot action variable based on a second context-variable value for the context variable detected at a second sensory-detection time; and initiate performance of a second robot action performance in accordance with the second value of the action variable.

In some implementations, the operations may comprise: identifying a third context-variable value for the context variable, the third context-variable value being detected at a third sensory-detection time that is after the before the third sensory-detection time; determining that the robot performed a third action in response to the third context-variable value, the third action be in accordance with application of the accessed policy; and inferring that the third action was satisfactory based on a lack of input data at least partly defining a correction command corresponding to the third action. The modification of the policy may be based on the third context-variable value.

In some implementations, the operations may comprise: identifying initial user input data derived from an initial user input received, the initial user input data at least partly defining a command that specifies an initial robot action for a robot to physically perform; identifying an initial context-variable value for a context variable detected by the robot at an initial sensory-detection time that corresponds to the initial input time; and determining the accessed policy based on the command and the first context-variable value for the context variable.

In some implementations, the operations may comprise: determining the first value of the robot action variable based on the first context-variable value for the context variable; and initiating the robot action in accordance with the first value of the robot action variable.

In some implementations, the policy may be modified using a learning model.

In some implementations, the corrective action may be indicative of a magnitude of action.

In some implementations, the robot may include the computing system and a motor used to perform at least part of the first robot action or the second robot action.

In some implementations, the user input may include input received at an interface at a user device remote from the computing system.

Yet another aspect of the disclosure relates to a computer-program product tangibly embodied in a non-transitory machine-readable storage medium, including instructions configured to cause one or more data processors to perform operations. Those operations may include: identifying a first context-variable value for a context variable detected by a robot at a sensory-detection time; accessing a policy that maps the context variable to a robot action variable; determining that a robot action characterized by a first value of the robot action variable was performed at an action time in response to detection of the first context-variable value, the first robot action being in accordance with application of the policy; determining that a user input was received at an input time corresponding to the action time, wherein user input data derived from the user input at least partly defines a corrective command that specifies a corrective robot action for physical performance, and the user input being indicative of at least partial dissatisfaction with the robot action; modifying the policy based on the correction command and the context-variable value; and causing the modified policy to be used to determine a second value of the robot action variable based on a second context-variable value for the context variable detected at a second sensory-detection time;

and initiate performance of a second robot action performance in accordance with the second value of the action variable.

In some implementations, the operations may comprise: identifying a third context-variable value for the context variable, the third context-variable value being detected at a third sensory-detection time that is after the before the third sensory-detection time; determining that the robot performed a third action in response to the third context-variable value, the third action be in accordance with application of the accessed policy; and inferring that the third action was satisfactory based on a lack of input data at least partly defining a correction command corresponding to the third action. The modification of the policy may be based on the third context-variable value.

In some implementations, the operations may comprise: identifying initial user input data derived from an initial user input received, the initial user input data at least partly defining a command that specifies an initial robot action for a robot to physically perform; identifying an initial context-variable value for a context variable detected by the robot at an initial sensory-detection time that corresponds to the initial input time; and determining the accessed policy based on the command and the first context-variable value for the context variable.

In some implementations, the operations may comprise: determining the first value of the robot action variable based on the first context-variable value for the context variable; and initiating the robot action in accordance with the first value of the robot action variable.

In another aspect of the present disclosure, a method is disclosed. In one embodiment, the method is for performing robot actions by a robot, and the method includes: defining a policy comprising a plurality of parameters for determining robot actions based at least in part on sensory-data inputs, the defining of the policy comprising mapping the sensory-data inputs to robot actions; receiving a first sensory-data input from a sensor; performing a first robot action at a first action time, wherein the first robot action is determined based at least in part on the first sensory-data input and application of the policy; determining that a user input was received at an input time corresponding to the first action time, wherein a corrective command at least partially derived from the user input specifies a corrective robot action for physical performance, the user input being indicative of at least partial dissatisfaction with the first robot action; and modifying the policy based on the corrective command and the first sensory- data input.

In another aspect of the present disclosure, a robot is disclosed. In one embodiment, the robot includes: an actuator configured to perform robot actions for robotic tasks; a sensor configured to detect an environmental context of the robot and generate sensory-data inputs; and a processor apparatus configured to: define a policy comprising a plurality of parameters configured to determine robot actions based at least in part on sensory-data inputs; determine that a user input was received at an input time corresponding to a performance of a first robot action corresponding to a detection of a first sensory-data input; generate a corrective command at least partially derived from the user input, the user input being indicative of at least partial dissatisfaction with the first robot action, and modify the policy based on the corrective command and the first sensory-data input.

In another aspect of the present disclosure, a non-transitory computer-readable storage medium is disclosed. In one embodiment, the non-transitory computer-readable storage medium has a plurality of instructions stored thereon, the instructions being executable by a processing apparatus to operate a robot, the instructions configured to, when executed by the processing apparatus, cause the processing apparatus to: define a policy comprising a plurality of parameters configured to determine robot actions based at least in part on sensory-data inputs, wherein the policy maps the sensory-data inputs to robot actions; receive a first sensory-data input; perform a first robot action at a first action time, wherein the first action is determined based at least in part on the first sensory-data input and application of the policy; determine that a user input was received at an input time corresponding to the first action time, wherein a corrective command at least partially derived from the user input specifies a corrective robot action for physical performance, the user input being indicative of at least partial dissatisfaction with the first robot action; and modify the policy based on the corrective command and the first sensory-data input.

The following detailed description together with the accompanying drawings will provide a better understanding of the nature and advantages of the present invention.

DETAILED DESCRIPTION

In some implementations, a policy is generated that controls how a robot is to perform a task by performing one or more actions (e.g., in response to specific sensor data). In some instances, a policy refinement can be made based on receipt of a corrective command. For example, a robot can respond to specific sensor data with a specific initial motor action. A corrective command can be received from a user that specifies an additional action or adjustment. Because task performance frequently involves an ongoing sensory motor loop, the robot can perform a corrective action in accordance with the corrective command. Further, an existing policy that led the robot to perform the initial specific motor action can be adjusted to bias it towards responding to the specific sensor data by performing an action corresponding to a net of the initial action and the corrective action. Thus, the policy used by the robot can be learned, often iteratively, by continued interactions with the user.

Figure 1A:
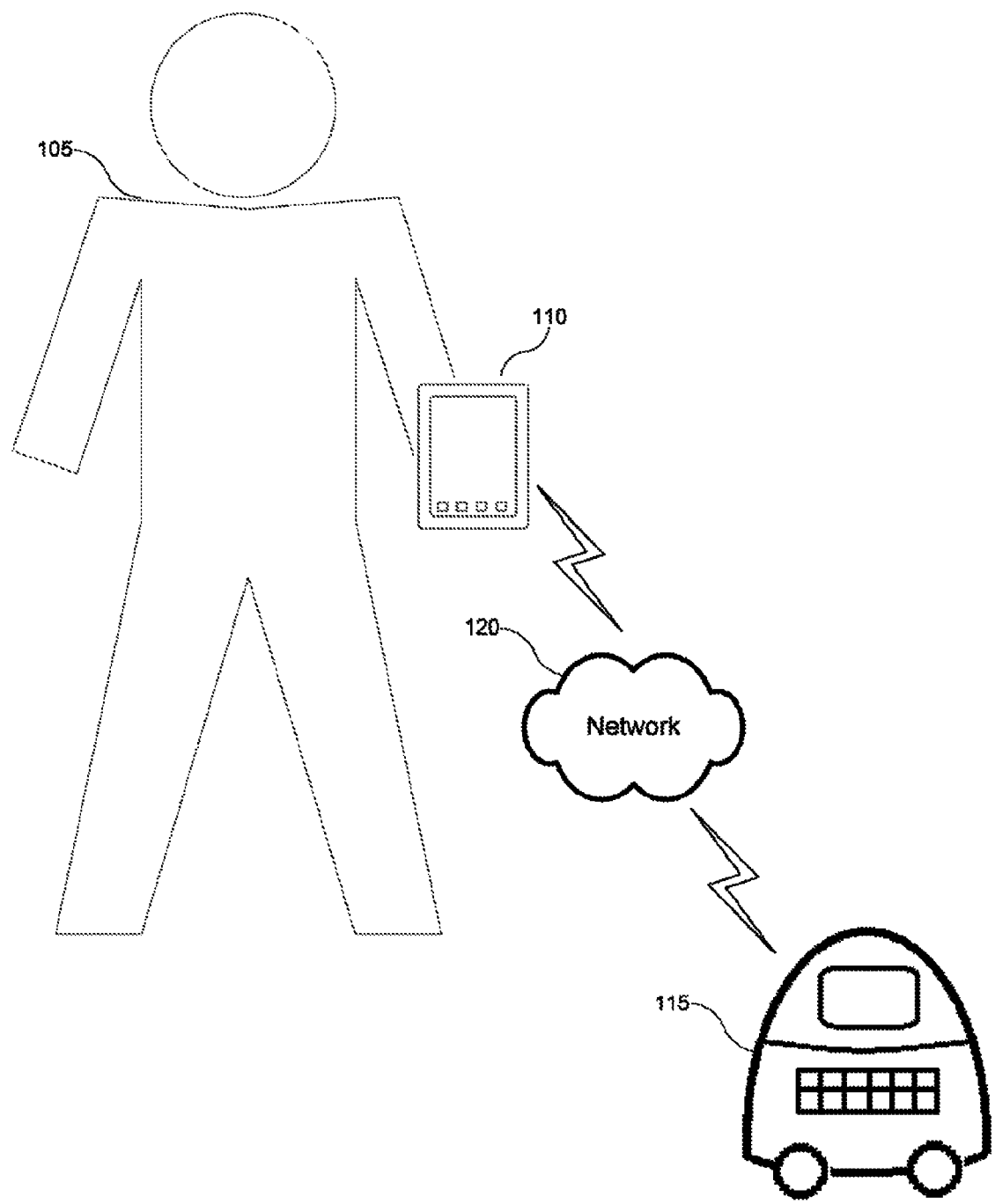
FIGS. 1A and 1B show a user device wirelessly communicating with a robot according to some implementations of the present invention.

FIG. 1A shows a user 105 using a user device 110 to communicate with a robot 115 according to an implementation of the invention. User device 110 and robot 115 can communicate over a network 120, which can include a wireless network, such as a short-range (e.g., Bluetooth network), a WiFi network or the Internet. User device 110 can include an electronic device (e.g., a mobile electronic device), such as a computer (e.g., tablet, laptop or personal computer), smart phone or other electronic device.

Robot 115 can include a machine configured to perform one or more actions (e.g., motor actions). The actions can be performed automatically and/or in response to sensor input. The action can include, e.g., an angular or translational movement of part or all of robot 115. For example, in FIG. 1A, robot 115 can respond to a verbal command by moving to a location (e.g., moving to a user in response to "Come here", moving towards a charging location in response to "Go home", moving towards a door in response to a doorbell). This task can include recognizing an audio signature, identifying a destination location, determining a path to the destination location and avoiding obstructions along the path. Thus, this task can include processing sensor data (e.g., collected by one or more sensors on robot 115), such as sensor data collected by a microphone and/or camera.

This onboard learning has the advantage of allowing a control policy to be rapidly updated and deployed. Offboard learning may require transferring data to a remote location, keeping state synchronized, updating a policy and returning the updated policy. These processes can incur communication latencies, consume power, or risk state de-synchronization. On the other hand, if a new policy can be generated locally (e.g. by updating a subset of onboard memory representing policy parameters), then time and energy can be saved, and there is no risk of desynchronizing state. Together, exploiting the low power and fast processing, it becomes feasible for a robotic system to learn continuously from sensory data.

A sensory-motor control policy can include a mapping from sensory data to proposed action, which can indicate which action is to be performed by robot 115 given a particular circumstance (or sensor-data measurement(s)). The mapping can be generated and/or refined based on user input (e.g., received at an interface of user device 110). In one instance (e.g., during a training phase or after a robot has not responded to sensory data), an initial policy is identified. There are many ways that such an initial control policy may be determined. For example, the initial policy may be determined by a preconfigured feedback controller (e.g. a Kalman filter), a policy learned in a virtual world (e.g. via reinforcement leaning or a genetic algorithm), a set of if-then instructions (e.g. an expert system), a cost function (e.g. via a model-based variational search), or some algorithm coded by a third-party. An initial policy may be loaded from a policy previously saved by a different user, potentially from a different environment and a different task, though likely related. An initial policy may be a random policy, which might be strange at first, but may help with learning. An initial policy may even indicate to do nothing until instructed.

A control policy can include one or more of a variety of structures that serve to map one or more sensory features (typically a set of time-varying values) to one or more motor features (typically a set of time varying values). For example, a structure of all or part of a policy can include, e.g., one or more if-then functions, feature weights, transformations and/or cluster assignments. In the example in FIG. 1A, sensory features may be values of depth detected by a range sensor and spectral-component amplitudes based on microphone data, and motor features may indicate velocity commands sent to the left and right wheels.

Within a structure of a policy, in some instances, a sensory feature can be arranged in a hierarchy and a motor feature can be arranged in a hierarchy. Hierarchies may be designed by experts (e.g., a selection of parameters chosen by an expert via an API) or learned by experience (e.g., an automated process that uses previous sensory motor experience to select parameters of a hierarchy). Hierarchies can be used to span longer timescales, and decompose and reassemble the combinations of re-occurring primitives.

Motor control may be structured hierarchically. For example, the bottom of a motor hierarchy may involve the placement and balancing of a legged-robot's foot, the next level may involve the sequencing of footsteps to establish a gait; the next level may involve the selection of a trajectory towards a desired location. Collectively, we may refer to the entire process of sequencing footsteps for navigation as "motor planning", with raw motor commands provided at the bottom (e.g., the forces to motors; each unitary action may occur quickly, e.g., every 10 ms) and more abstract commands at the top (e.g. the selection of a new target location; each action cycle may occur slower, e.g., every 10 seconds). A single layer in a hierarchy may include an input-output mapping (e.g., from the layer below to the layer above, and/or from the layer above to the layer below), a internal transform (e.g., representing the impact of the previous state on the next state in a sequence), a decoding transform (e.g., indicating to the user what the current state means), and an encoding transform (e.g., enabling a user to provide corrective commands at that level of the hierarchy). Each mapping or transform may be learned from previous experience (e.g., iteratively composed by corrective commands, or fit to minimize the error of a cost function upon previous experience).

Sensory processing may be structured hierarchically. For example, the bottom of a visual hierarchy may involve the detection of local visual features (e.g. contrast edges, image patches, simple translations), the next level may involve the re-occurring relationships of components (e.g. objects, motion transforms), the next level may involve the representation of scenes and event types within the scene. Collectively, we may refer to the entire process of recognizing the properties of objects and events within a scene as "sensory processing," with raw sensory data provided at the bottom (e.g. pixels from video streams, audio from microphone; each unitary processed sample may occur quickly, e.g. every 1 ms or every 40 ms), and more abstract sensory representations at the top (e.g. that the location is a living room, that the subject is smiling, that the subject is waving; each unitary event may persist, e.g., a wave for seconds, a location for hours). A single layer in a sensory hierarchy may include an input-output mapping, (e.g., from the layer below to the layer above, and/or from the layer above to the layer below), and a decoding transform (e.g., indicating to the user what the current sensory state means). Each mapping or transform can be learned from previous experience (e.g., constructed by unsupervised learning algorithm) or other methods.

A sensory-motor control policy can include a mapping from sensory data to proposed action, which can indicate which action is to be performed by robot 115 given a particular circumstance (e.g. given the sensory state and the robot's internal state). To illustrate, in FIG. 1A, an initial control policy (which may contain parameters and variable part of the robots internal state) can indicate that robot 115 is to remain stationary. When the user provides the first command received at user device 110 to move forward, robot 115 will begin to move forward. Sensor data (e.g., from a camera indicating the absence of objects in front of the robot) collected before receipt of the command can be associated with the move-forward action, and the initial control policy can be revised based on the association. Though this revision can be quickly performed and can affect the current action, the resulting policy may be too crude for future contexts. For example, the revised policy can indicate that robot 115 is to continue to move forward indefinitely. However, because user 105 is present, she will likely provide a command at user device 110 to turn or stop at some point (e.g., before colliding with a wall). The policy can then be accordingly further revised. In time, due to the presence of corrective commands, the policy can learn that moving forward should not be applied in all contexts, as other circumstances will require, stopping, turning, backing up, etc.

The initial control policy can be revised and/or refined using one or more corrective commands provided by user 105 (e.g., via user device 110). The corrective command can be received after a robot has performed an initial action and can specify an additional "corrective" action that the robot is to perform, such that the combination of the initial action and the corrective action result in a presumed desired action. In this manner, the mapping can be routinely and iteratively refined.

In some implementations, policy revisions can be alternatively or additionally influenced by a lack of corrective commands. Such an absence can provide a basis for an inference that a user approved that a performed action was appropriate given a situation (e.g., sensor data). Thus, a real-time or subsequent revision can be made to bias towards the same action in response to similar or same sensor data. In some instances, an indication that user 105 is present (e.g., near robot 115 and/or using device 110) can influence whether and/or to what extent the inference (that the action was acceptable) is made, and thus, whether and/or to what extent a policy revision is based on an association between the corresponding sensor data and performed action. An indication of user presence can include, e.g., interaction with user device 110, detection by robot 115 of movement, detection of movement of user device 110, detection that user device 110 is near robot 115, detection that user device 110 is in an active state (e.g., versus a sleep state), etc.

In another implementation, select sensory data (e.g. a facial expression, or hand gesture, or body pose, captured from a camera onboard the robot, or a remote camera streaming user images) can be treated as a corrective command. Sensory data equivalent to a corrective command can be learned by the robot from ongoing experience, or can by trained during a pairing procedure where the sensory data equivalent (e.g. a hand gesture) is synchronized by the user with corrective commands from another interface (e.g. remote control, a keyboard, a mouse). By this means, the same system of corrective commands, explicitly coded to one interface (e.g. keyboard), can be applied to a novel and custom set of commands (e.g. gestures and poses of body or hand). It can also be appreciated, that a robot exhibiting a rich set of known behaviors (e.g., cyclic reaching trajectories) can also be temporally paired with a custom set of user actions (e.g., eye movements), enabling an intuitive interface of for subsequent corrective commands. (e.g., looking at a target location and pressing a button may constitute a corrective command for a robot's arm to obtain a particular position).

It will also be appreciated that user input can include affirmative approval of an action. A real-time or subsequent policy revision can then be made to bias towards the same action in response to similar or same sensor data. This bias can be greater than or the same as a bias based on an inferred approval.

Revising or refining the control policy can include, e.g., modifying one or more weights (e.g., a weight of a connection between multiple nodes) for the control policy; adding, modifying or removing a function (e.g., an if-then function or part or all of a cost function) or node for the control policy; adding, modifying or removing a constraint (e.g., a constraint on a number of motion-type clusters, a constraint on the communication bandwidth of a component, or a constraints on the sparseness of a representation); a time-scale of a persistence of a learned component; modifying or replacing the function of a component (e.g. by updating the microcode evaluated within a node, or updating a parameter that determines the node's response); by modifying the process of refining the policy (e.g. by increasing or decreasing the learning rate to some or all components), etc.

This iterative refinement of a control policy based on corrective commands is incredibly powerful tool for a robot learning new behaviors, because it allows every-day users to shape the operation of a robot (e.g., rather than requiring intervention of a software expert). Because corrective commands can be intuitive (e.g. telling the robot what you want it to do when it looks like it might make a mistake), a broad range of people have the requisite skills to provide commands shaping performance of novel behaviors. In other systems, training can be tedious, relying on thousands of micro-instructions. Complex behaviors can be insurmountable. By iteratively training the control policy, users can create increasingly complex behaviors, focusing on one attribute at a time.

Revisions of a control policy based on corrective commands automatically hone in on errors. The user interface provides the user a means to modify the robots action at any moment. Alternative methods may require a more conservative learning process, with smaller changes in the control policy, or changes that apply only to very narrow contexts. The presence of a user, with a continuous connection to the robots actions during learning, can mitigate the consequence of false positives. Thus, the continuous connection to the user enables the learning process to generalize more aggressively, both with a faster rate of policy change and a broader application of context for each learning incident. As a result, the entire learning process can be sped up.

Figure 1B:
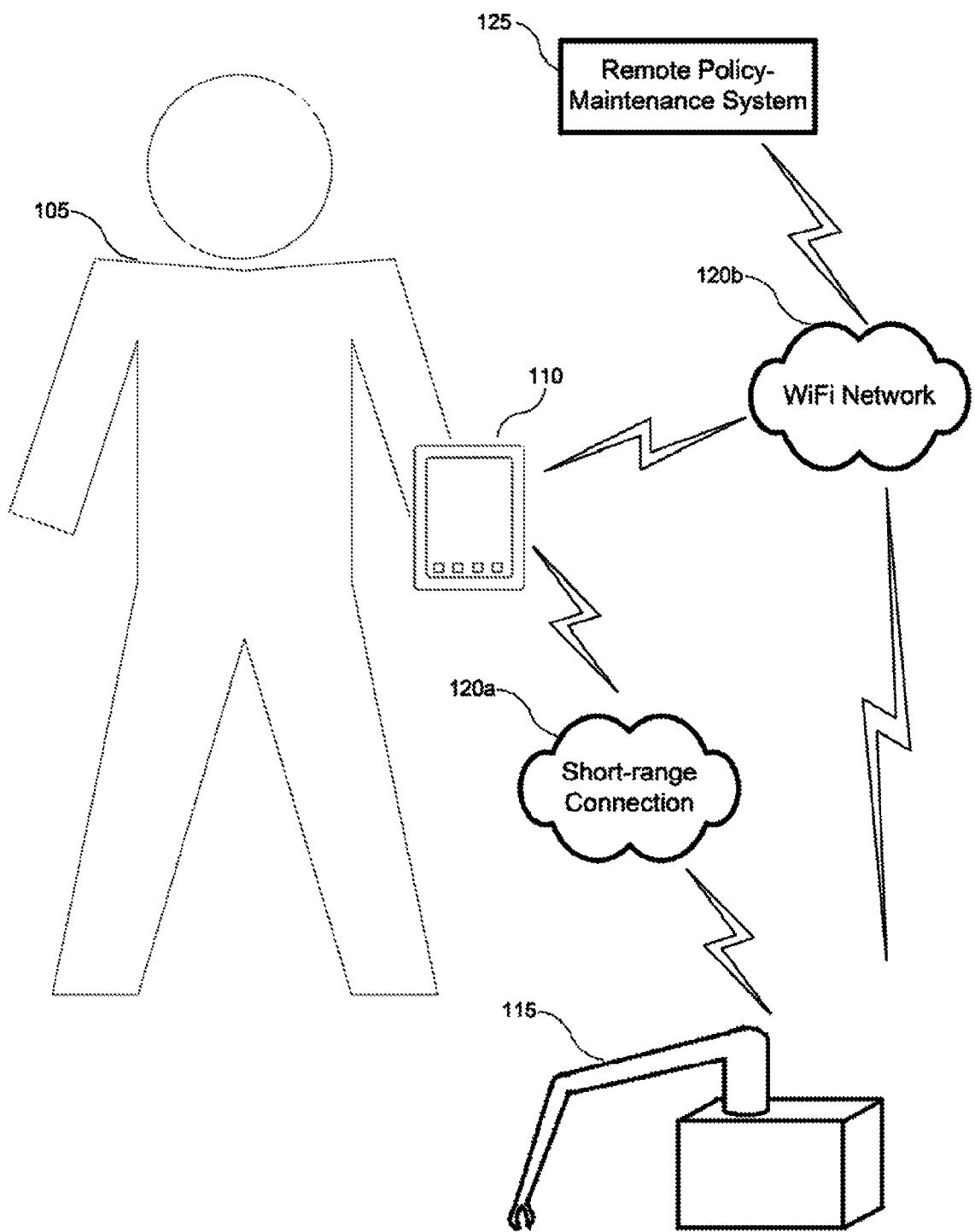

FIG. 1B shows a user 105 using a user device 110 to communicate with a robot 115 according to another implementation of the invention. FIG. 1B illustrates possible direct and indirect communication channels between user device 110 and robot 120.

FIG. 1B illustrates an implementation where user device 110 can communicate directly with robot 115 (e.g., via a short-range connection 120a, such as, a Bluetooth or BT-LE connection) and/or can communicate indirectly with robot 115, using a WiFi network 120b. Thus, e.g., a command (e.g., a corrective command) can be transmitted to a local or remote policy-maintenance system 125. Policy-maintenance system 125 then determines an appropriate action for robot 115 to perform and/or generate or revise a command policy. Policy-maintenance system 125 can then send action instructions and/or the policy to robot 115. In one instance, a command is transmitted both to robot 115 (e.g., to initiate a corresponding action) and to policy-maintenance system 125 (e.g., for possible control-policy refinement).

This indirect communication channel can produce advantages such as cross-robot policy definitions or modifications, expanded sensor-data processing, remote backup, distribution of algorithms, network testing services, telepresence robotic viewing and control, and massively multiplayer augmented reality robotic gaming. It will be appreciated that some implementations of the invention do not utilize a remote system and are instead focused on direct device-to-robot communications.

FIG. 1B further illustrates that robot 115 can have a variety of forms and/or motion capabilities. In FIG. 1B, robot 115 is not itself configured to propel its entire self. Rather, robot 115 includes a moveable arm with a pincher that can clasp onto objects. Thus, robot 115 can be configured to pick up and move an object.

It will be appreciated that the robots depicted in FIGS. 1A and 1B are exemplary, and a robot can have a variety of features and/or operation capabilities. For example, a robot can include a crane that is capable of rotational and translational movement. In one implementation, a translational movement in a height dimension can be manually controllable (e.g., and not specified by a control policy), though an angular position (relative to an axis perpendicular to ground) of the crane's arm can be defined based on an output of a control policy that receives sensory data from a camera with an aerial viewpoint.

As another example, a robot can include a nail gun to inject nails at regular intervals along the length of a plank, based on the sensory data of optic flow, accelerometers, wheel rotations, time intervals, pressure sensor, depth sensors, and user commands (e.g. to locomote, steer, stop, inject nails, return to power supply, and return to nail supply).

As another implementation, a robot includes a toy or real vehicle (e.g., a car) with steering, acceleration and/or braking controls. Commands can be received via an interface in the vehicle itself or via a remote control. The commands can be used along with camera and/or sonar sensor data to develop a policy to avoiding colliding with walls or obstacles.

Other examples of robots and actions that can be defined based on control policies generated using user commands and sensor data (e.g., from a camera, microphone, pressure sensor or other sensor) include:

A robotic arm (e.g., with multiple degrees of freedom): touching a location marked by a laser pointer.

A robotic submarine: following an underwater pipe and collecting inspection data at areas with particular visual characteristics or at times corresponding to user input identifying interest.

A pool toy: following and tagging a swimmer as part of a game.

An interactive robot (e.g., with gesture and/or speech capabilities): engaging pedestrians (e.g., through gestures or speech) who pass by.

A welding robot: welding a seam between adjoining surface, or along a marked line.

A maintenance robot: mowing a lawn, painting a region, or cleaning a surface.

A produce-picking robot (e.g., with the ability to pinch produce with a varying degree of force and remove it from a branch, vine or stem): picking fruits or vegetables.

A security robot (e.g., to explore within a boundary and report and categorize observations of changes to the environment)

Home automation system (e.g., where behavioral outputs are adjustments to temperature, lighting, window shades, ventilation flow, music volume)

Figure 2:
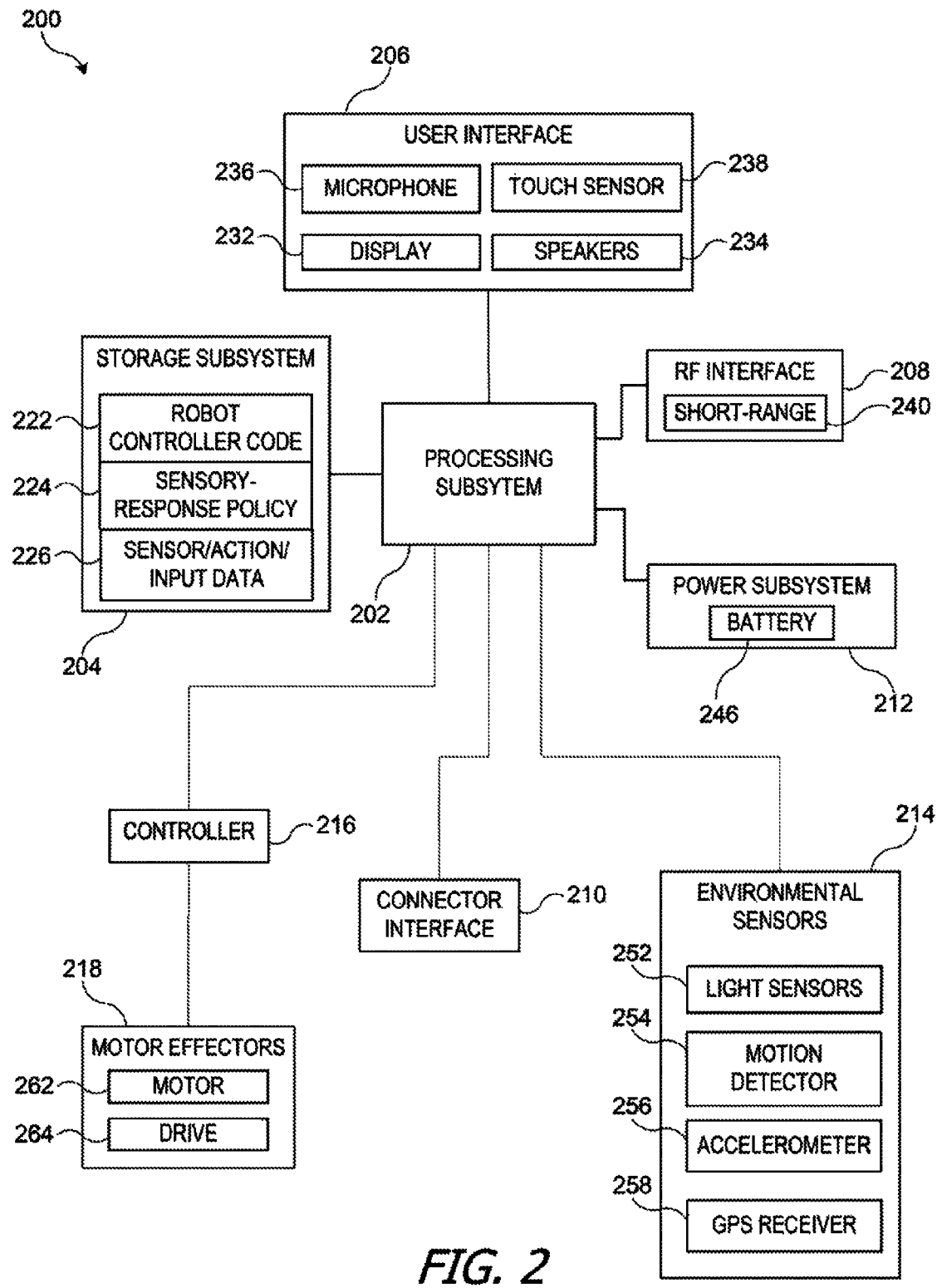
FIG. 2 is a simplified block diagram of a robot according to an implementation of the present invention.

FIG. 2 is a simplified block diagram of a robot 200 (e.g., implementing robot 115) according to an implementation of the present invention. Robot 200 can include processing subsystem 202, storage subsystem 204, user interface 206, RF interface 208, connector interface 210, power subsystem 212, environmental sensors 214, controller 216, and motor effectors 218. Robot 200 need not include each shown component and/or can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some implementations, storage subsystem 404 can store a robot controller code 222 (which can be part of an operating system of the robot, part of an app or separate as desired). Robot controller code 222 can be configured such that execution of the code causes robot 200 to collect appropriate sensor data and evaluate the sensor data using a generated or stored sensory-response policy 224 to determine an appropriate response action. Execution of robot controller code 222 can further cause robot 200 to perform the determined action and monitor for any indication as to whether the action was appropriate. For example, the robot may monitor for a communication from a user device including a corrective command, thereby indicating that the action was not satisfactory. Execution of robot controller code 222 can further cause robot 200 to routinely assess policy 224 and modify policy 224 when a modification criterion (e.g., a detection of a corrective command) is satisfied. Execution of the code can further cause detected sensor data, identifications of performed robot actions and/or identifications of user-satisfaction responses (e.g., corrective commands) to be stored in a sensor/action/input data store 226.

Processing subsystem 202 can be implemented as one or more integrated circuits, e.g., one or more single-core or multi-core microprocessors or microcontrollers, examples of which are known in the art. In operation, processing system 202 can control the operation of robot 200. In various implementations, processing subsystem 204 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for robot 200. For example, in some implementations, processing subsystem 202 can execute robot controller code 222 to thereby, e.g., control collection of sensor data, evaluate of the sensor data (using a sensory-response policy) to identify a robot-response action, initiate performance of the response action, and/or evaluate of the sensory-response policy based on any identifications of user response to the performed action. In some implementations, some or all of the code can operate locally to robot 200.

In some instances, robot 200 includes a user interface 206, which can include any combination of input and output devices. A user can operate input devices of user interface 206 to invoke the functionality of interface robot 200 and can view, hear, and/or otherwise experience output from robot 200 via output devices of user interface 206. Examples of output devices include display 232 and speakers 234. Examples of input devices include microphone 236 and touch sensor 238.

Display 232 can be implemented using compact display technologies, e.g., LCD (liquid crystal display), LED (light-emitting diode), OLED (organic light-emitting diode), or the like. In some implementations, display 232 can incorporate a flexible display element or curved-glass display element, allowing it to conform to a desired shape. One or more speakers 234 can be provided using any technology capable of converting electronic signals into audible sound waves. Speakers 234 can be used to produce tones (e.g., beeping or ringing) and/or speech.

Examples of input devices include microphone 236 and touch sensor 238. Microphone 236 can include any device that converts sound waves into electronic signals. In some implementations, microphone 236 can be sufficiently sensitive to provide a representation of specific words spoken by a user; in other implementations, microphone 236 can be usable to provide indications of general ambient sound levels without necessarily providing a high-quality electronic representation of specific sounds.

Touch sensor 238 can include, e.g., a capacitive sensor array with the ability to localize contacts to a particular point or region on the surface of the sensor and in some instances, the ability to distinguish multiple simultaneous contacts. In some implementations, touch sensor 238 can be overlaid over display 232 to provide a touchscreen interface, and processing subsystem 504 can translate touch events into specific user inputs depending on what is currently displayed on display 232.

It will be appreciated that one or more components of user interface 206 (e.g., microphone 236 and/or touch sensor 238) can also serve as an environmental sensor 218. Further, it will be appreciated that, in some instances, data (e.g., including touch or speech data) received at an input device of user interface 206 can be considered as environmental data to be evaluated, e.g., using a sensory-response policy to identify an appropriate response action.

RF (radio frequency) interface 208 can allow robot 200 to communicate wirelessly with various interface devices. RF interface 208 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some implementations, RF interface 208 can implement a short-range sensor (e.g., Bluetooth or BLTE) proximity sensor 240 that supports proximity detection through an estimation of signal strength and/or other protocols for determining proximity to another electronic device. In some implementations, RF interface 208 can provide near-field communication ("NFC") capability, e.g., implementing the ISO/IEC 18092 standards or the like; NFC can support wireless data exchange between devices over a very short range (e.g., 20 centimeters or less). RF interface 208 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 208.

Connector interface 210 can allow robot 200 to communicate with various interface devices via a wired communication path, e.g., using Universal Serial Bus (USB), universal asynchronous receiver/transmitter (UART), or other protocols for wired data communication. In some implementations, connector interface 210 can provide one or more power ports, allowing robot 200 to receive power, e.g., to charge an internal battery or provide power for motors. For example, connector interface 210 can include a connector such as a USB host connector, a USB Host/Device on-the-go, a multi-pin direct board-to-board connection (e.g. 25 pin, 80 pin, 256 pin, etc.), HDMI video output channel, multi-channel audio output (e.g. 6 channels), multiple GPIO (e.g. 62 configurable channels), 5V pulse outputs (e.g., one or more servo drivers, such as 4 or more and/or 256 or fewer servo drivers (e.g., 8 servo drivers)), pins for analog input (e.g. with A/D conversion), channels for receiving radio controlled signals (e.g. via a radio controlled receiver), DC motor output (e.g., 1-256 pulse width modulated drivers (e.g., 4 pulse width modulated drivers) at 24V), and other sensory motor input and output consistent with other robotic standards (e.g. Mindstorm sensors and motors).

Power subsystem 212 can provide power and power management capabilities for robot 200. For example, power subsystem 212 can include a battery 246 (e.g., a rechargeable battery) and associated circuitry to distribute power from battery 246 to other components of robot 200 that require electrical power (e.g., motor effectors 218). In some implementations, power subsystem 212 can also include circuitry operable to charge battery 246, e.g., when connector interface 210 is connected to a power source. In some implementations, power subsystem 212 can include a "wireless" charger, such as an inductive charger, to charge battery 246 without relying on connector interface 210. In some implementations, power subsystem 212 can also include other power sources, such as a solar cell, in addition to or instead of battery 246.

Environmental sensors 214 can include various electronic, mechanical, electromechanical, optical, or other devices that provide information related to external conditions around robot 200. Sensors 218 in some implementations can provide digital signals to processing subsystem 202, e.g., on a streaming basis or in response to polling by processing subsystem 202 as desired. Any type and combination of environmental sensors can be used; shown by way of example are a light sensor 252, a motion detector 254, an inertial measurement unit (IMU), a global positioning system (GPS) receiver 258. Light sensor 252 might include a CMOS or CCD camera that captures a video stream, and provides each frame for subsequent processing. Light sensor 252 may also include sensor designed to pick up a particular range of electromagnetic spectrum, such as an infrared camera, or a photodiode, or a spectral range consistent with a paired emitted light source. Motion sensor 254 may include based on optical flow, or a change in the distribution of angular luminance, after accounting for self motion. An IMU can include an accelerometer 256, a gyroscope and/or a magnetometer. Information from one or more of these IMU-included sensors can be combined to provide information about velocity, orientation and/or forces. GPS receiver 258 collects satellite signals from a plurality of satellites and determines a geographical position of the robot based on the signals. It will be appreciated that one, more or all of the signals can alternatively be collected (e.g., by another or same receiver) from other transmitters, such as a WiFi transmitter.

It will be appreciated that specific environmental sensors 214 shown in FIG. 2 are illustrative. Other sensors can be additionally or alternatively included in and/or used by robot

200. For example, such other sensors can use one or more of a piezoelectric sensor, a contact sensor, an optic flow sensor, a thermometer, a barometer, a potentiometer, a magnetometer, a humidity sensor, a force sensor, a laser depth sensor, a visual 3D sensor, sonar, and lidar. It will further be appreciated that components of user interface 206 can additionally or alternatively act as an environmental sensor. For example, microphone 236, touch sensor 238, a push button, a dial, or a joystick may be informative about the robot's environment.

Motor effectors 218 can include one or more motors 262 and one or more drives 264. Various motors (e.g., geared motors, stepper motors, brushless motors, servos) or linear actuators (e.g., mechanical, hydraulic, pneumatic, electro-mechanical, piezoelectric, etc.) or other actuators may be used as appropriate for the robotic task (e.g., to generate forces at joints angles, rotate wheels, take an appropriately focused image, tag or scan an item, etc.).

It will be appreciated that robot 200 is illustrative and that variations and modifications are possible. For example, robot 200 can include additional components not shown in FIG. 2, such as wheels, fluid controllers, vacuum channels, propellers, grippers, collection trays, touch screens, credit card scanners, shearing blades, dermo-tactile effector, heating elements, electromagnetic coils, etc.

It is also not required that every block in FIG. 2 be implemented in a given implementation of a robot 200. For example, in some instances, robot 200 does not include a user interface 206.

Figure 3:
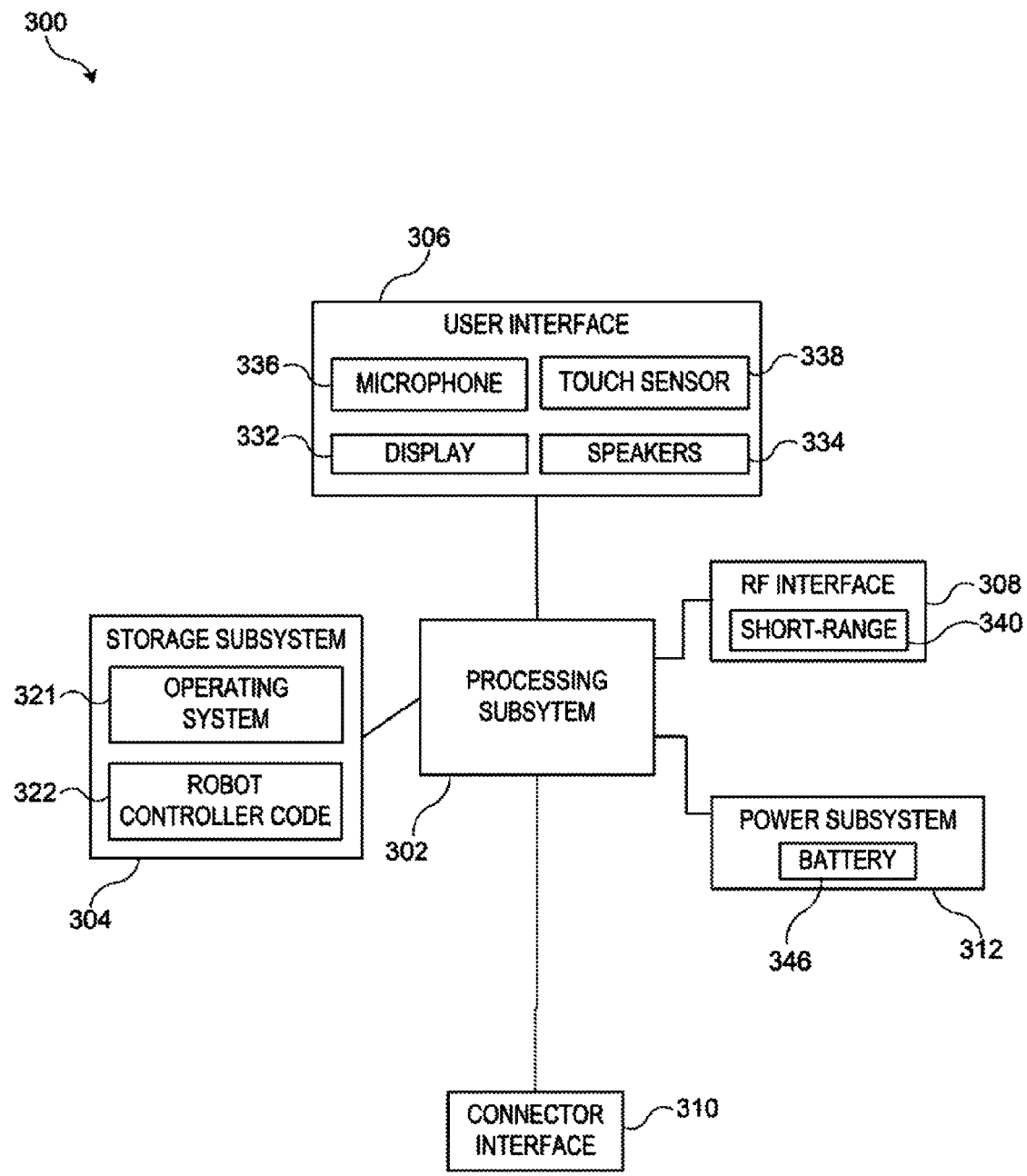
FIG. 3 is a simplified block diagram of an electronic device in communication with a robot according to an implementation of the present invention.

A user device such as server 110 of FIG. 1 can be implemented as an electronic device using blocks similar to those described above (e.g., processors, storage media, user interface devices, data communication interfaces, etc.) and/or other blocks or components. FIG. 3 is a simplified block diagram of a user device 300 (e.g., implementing user device 110 of FIG. 1) according to an implementation of the present invention. User device 300 can include processing subsystem 302, storage subsystem 304, user interface 306, RF interface 308, a connector interface 310 and a power subsystem 312. User device 300 can also include other components (not explicitly shown). Many of the components user device 300 can be similar or identical to those of robot 200 of FIG. 2.

For instance, storage subsystem 304 can be generally similar to storage subsystem 204 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 204, storage subsystem 304 can be used to store data and/or program code to be executed by processing subsystem 302.

User interface 306 can include any combination of input and output devices. A user can operate input devices of user interface 306 to invoke the functionality of user device 600 and can view, hear, and/or otherwise experience output from user device 300 via output devices of user interface 606. Examples of output devices include display 332 and speakers 334. Examples of input devices include microphone 336 and touch sensor 338. These input and output devices can be similar to output devices described above with reference to FIG. 2.

Processing subsystem 302 can be implemented as one or more integrated circuits, e.g., one or more single-core or multi-core microprocessors or microcontrollers, examples of which are known in the art. In operation, processing system 302 can control the operation of user device 300. In various implementations, processing subsystem 302 can execute a variety of programs in response to program code and can maintain multiple concurrently executing programs or processes. At any given time, some or all of the program code to be executed can be resident in processing subsystem 632 and/or in storage media such as storage subsystem 304.

Through suitable programming, processing subsystem 302 can provide various functionality for server 300. For example, in some implementations, processing subsystem 302 can execute an operating system (OS) 321 and various applications such as a robot controller application 322. In some implementations, some or all of these application programs can interact with a robot, e.g., by generating messages to be sent to the robot and/or by receiving and interpreting messages from the robot. In some implementations, some or all of the application programs can operate locally to user device 300.

Processing subsystem 302 can also execute robot-controller code 322 (which can be part of OS 321 or separate as desired). In some implementations, execution of robot controller code 322 can cause user device 300 to receive information from a robot. The information can include, e.g., information pertaining to detected sensor data, an action-related state of the robot (e.g., a graphical summary of its current task, goals, and intentions), a non-action-related state of the robot (e.g., a current charge) and/or an indication of what action was recently performed.

Execution of robot controller code 322 can further provide an interface that allows a user to provide inputs influencing operation of robot 115. The inputs can, e.g., specify a command (e.g., turn left at 30 deg/sec) or a corrective command (e.g., turn left 2 deg/sec faster than the current rotation) that the robot is to perform and/or a satisfaction (e.g., a binary satisfied/dissatisfied indication or a satisfaction level) of a performed action. The inputs can further specify restrictions or preferences for a control policy (e.g., including a schedule for performance of a repeated task or to prohibit a specific action type). The inputs can further inform robot controller code 322 of infrastructural procedures, e.g., that aspects of the data should be displayed or saved, e.g., that user-specified subsets of sensor input/action data 239 (or processed versions thereof) should be transferred to processing subsystem 302 for display or storage on a remote system. These transmissions can serve as, e.g., commands for the robot to perform an action and/or for data to be used for refinements of an existing command policy and/or to update the ongoing signals exchanged between processing subsystem 202 and 302.

Microphone 336 may provide an alert sound to prompt user, e.g. for consent to perform a new task, or request the users preference for one task over another (e.g., whether to continue or to return to base to charge battery), or the user's estimate of one sensory state over another (e.g. to ask if the current image contains a bad apple), or to request an evaluation of a preceding behavior (e.g., whether packages were well stacked on a shipping crate), or to request a threshold adjustment for a task (e.g., to specify a threshold for how ripe a fruit should be before being picked, with respect to a displayed distribution of ripeness estimates). User may view a graphical representation of such prompts on user display 332. User may indicate a choice via user interface 303, e.g., by touch sensor 338, button, gesture recorded by camera, or a vocal command encoded by microphone 336.

RF (radio frequency) interface 308 can allow user device 300 to communicate wirelessly with various other devices and networks. RF interface 308 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some implementations, RF interface 308 can implement a Bluetooth LE (Low energy) proximity sensor that supports proximity detection through an estimation of signal strength and/or other protocols for determining proximity to another electronic device. In some implementations, RF interface 308 can provide near-field communication ("NFC") capability, e.g., implementing the ISO/IEC 18092 standards or the like; NFC can support wireless data exchange between devices over a very short range (e.g., 20 centimeters or less). RF interface 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 308.

Power subsystem 312 can provide power and power management capabilities for server 600. For example, power subsystem 312 can include a battery 340 (e.g., a rechargeable battery) and associated circuitry to distribute power from battery 340 to other components of user device 300 that require electrical power. In some implementations, power subsystem 312 can also include circuitry operable to charge battery 346, e.g., when an electrical connector (not shown) is connected to a power source.

It will be appreciated that user device 300 illustrative and that variations and modifications are possible. In various implementations, other controls or components can be provided in addition to or instead of those described above. Any device capable of transmitting action command to another device (e.g., robot 200 or an intermediate server) can be a user device.

Further, while the server is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present invention can be realized in a variety of apparatus including electronic devices implemented using any combination of circuitry and software. It is also not required that every block in FIG. 3 be implemented in a given implementation of a mobile device.

Communication between a robot and user device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Implementations of the invention are not limited to particular protocols, and those skilled in the art with access to the present teachings will recognize that numerous protocols can be used.

In accordance with certain implementations of the present invention, devices can communicate such that robot actions are at least partly controlled by inputs received at a user device. Thus, a user of the user device may be able to observe a robot action (e.g., triggered based on sensory data) and "correct" the action if needed. The correction can simultaneously provide an indication that the performed action was not completely satisfactory and a specification as to what is to be improved in that regard.

Figure 4:
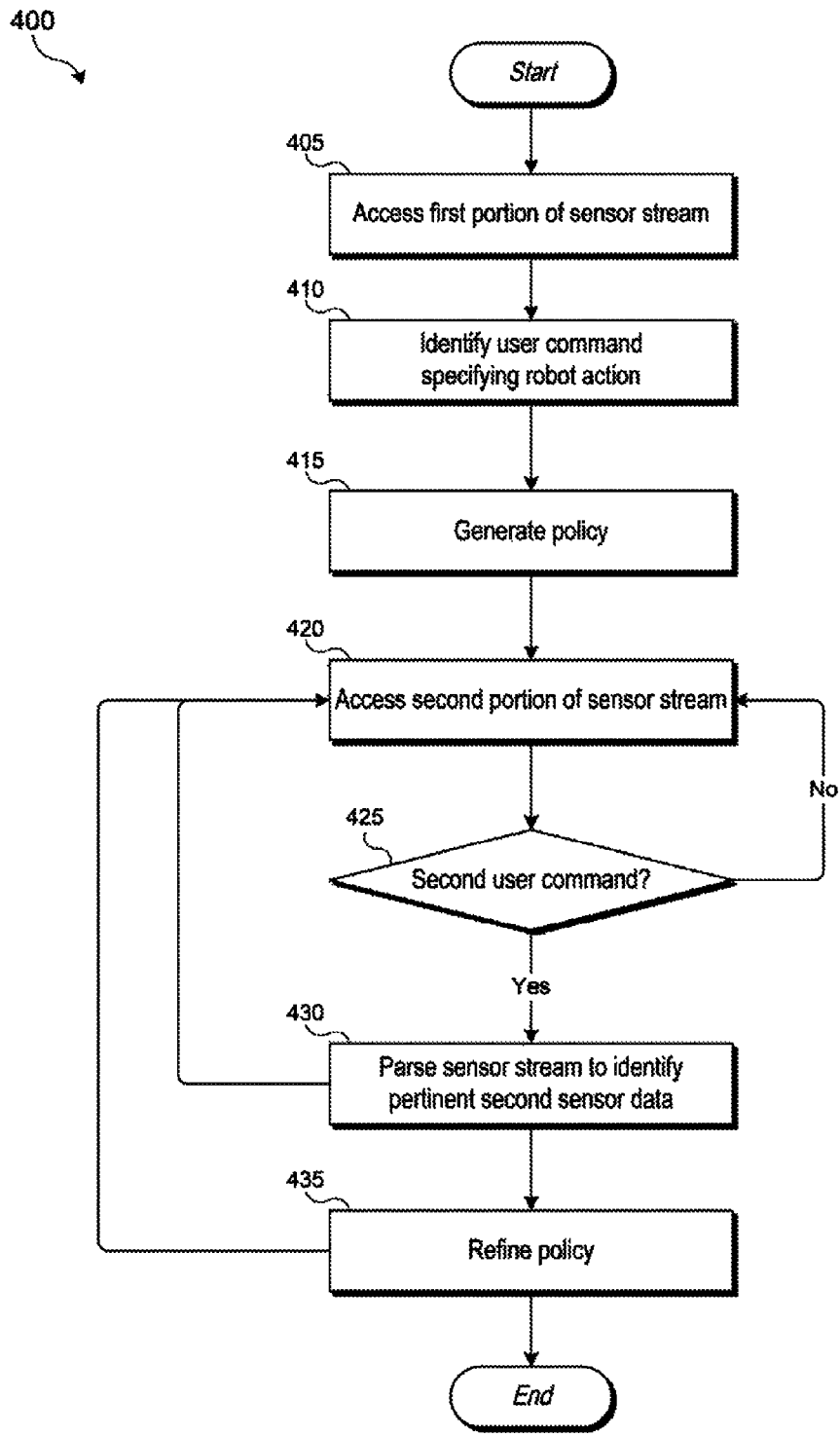
FIG. 4 is a flow diagram of a process for generating a robot sensory-response policy using sensor data and user actions (or lack thereof) according to an implementation of the present invention.

FIG. 4 is a flow diagram of a process 400 for generating a robot sensory-response policy using sensor data and user actions (or lack thereof) according to an implementation of the present invention. Part or all of process 400 can be implemented in a robot, a user device or a remote server. Process 400 begins at block 405 where a first portion of a sensor stream is accessed. The sensor stream can include a stream of data collected by an environmental sensor of a robot. For example, the sensor stream can include a stream of video data collected by a camera on a robot. The portion can include a time-series (e.g., a value for each of one or more variables at each of a set of times) or one or more discrete variable values. The first portion can include a portion of sensor data collected during an explicit training session (or part thereof) or during part of a normal operation (or mixed-mode) session. In one instance, the first portion includes a portion of sensor data received subsequent to a user input requesting generation of a new policy. The first portion of the sensor data can include sensor data collected from each of one, more or all environmental sensors present on a robot.

At block 410, a user command specifying a user action is identified. The user command can be determined based on locally received input or based on a communication identifying user input. The input can specify, e.g., whether a robot is to act and/or specifics of any action (e.g., a movement magnitude, a movement direction, a movement speed and/or a movement force). In one instance, a robot may include multiple effectors, and a command can indicate which portion of a robot (e.g., which effector) is to act and how.

At block 415, a policy is generated based on the first portion of the sensor stream and the user command. The policy can include one or more if-then functions, an algorithm, a model and/or a flowchart. The policy can be structured to receive, as input, one or more variables based on sensor data and can be structured to produce, as output, an indication as to whether and/or how a robot is to act in response to the sensor data.

As one example, an initial policy is or includes a default policy. The default policy can be one that specifies that a robot is to refrain from acting until a command is received. The default policy can be one based on policies learned for other robots (e.g., of a similar type associated with a same user and/or one or more different users).

As another example, an initial policy can include one partly or completely specified from user input. To illustrate, an interface on a user device can identify multiple sensory data (e.g., depictions of expected types of visual data) and can allow a user to select from amongst a list (or continuum) of available response actions. As yet another example, an initial policy can be generated based on user inputs received during a training period (e.g., identifying a satisfaction with an action, repeatedly specifying a desired action or identifying desired modifications to actions).

At block 420, a second portion of a sensor stream is accessed. The first and second portion can be collected by a same session or in different sessions. A same robot, or (in other implementations, different robots) can collect the sensor streams. The first and second portions can include at least one, more or all of a same type of sensor data.

At block 425, a determination is made as to whether a second user command has been received. As is described further herein, the generated policy and second portion of the sensor stream can be used to determine whether and/or how a robot is to act in response to the second portion. The robot can then act accordingly.

The second user command can include a robot instruction indicating whether any performed action (and/or lack thereof) was satisfactory and—if not—how it is to be corrected. For example, a second user command can include a corrective command that indicates that a robot should prolong movement in a direction or at least partly reverse a movement. To illustrate, a user may interact with a user device to press an arrow or move a controller in a direction corresponding to a desired corrective movement until a portion of the robot has moved to a desired location. As another illustration, a user may click on a button option representing a desired movement.

A single user command at one moment in time may indicate one or more corrective attributes (e.g. to accelerate and to turn right more). A command can be generated based on a state of a controller of a user interface, such as the positions of one, more or all joysticks and buttons on a gaming console; a position of a wheel and/or a trigger state of an RC control; a value of one, more or all joint angles and/or pressures measured by a haptic glove; one or more parameters estimated from of a user's body movement, hand gesture or gaze location; a location and/or movement of the user estimated using data collected by one or more motion capture systems, electromyograms or electroencephalograms; a touch sequence and/or gesture history recorded by a touch screen; the physical state of the robot, as may have been repositioned by the user; and/or a feature extracted from a video stream of the user. Often a corrective command will contain one or more analog values which indicate that the robot ought to change one or more control attributes.

User inputs can correspond to action commands. A relationship between the inputs and action commands can be pre-defined, defined by a user or learned. In some implementations, a mapping of user actions (e.g. touches, gestures, clicks, presses, knobs turns, joystick pressures) to robotic control attributes (e.g. rotations, velocities, joint angles, forces, torques, location set points, speed-accuracy trade offs, target following distances, target following azimuths) is determined beforehand, and the values of these corrective commands are sent in real time to the robot.

When no second user command is detected, process 400 returns to block 420, where a new second portion of a sensor stream is accessed and monitoring continues for responsive user commands. When a second user command is detected, process 400 continues to block 430 where the sensor stream is parsed to identify sensor data corresponding to the second user command. In one instance, all sensor data in the sensor stream (e.g., stream including data collected from one or more sensors) within a fixed time period before the second user command is identified as being pertinent. In one instance, data in the sensor stream that triggered a robot action preceding detection or receipt of the second user command is identified as being pertinent.

At block 435, the policy is refined based on the parsed sensor stream and second user command. As will be described in further detail herein, each of various portions of sensor data can be associated with a target (e.g., "desired") action. In one instance, the target action can include one specifically identified in a user command. In one instance, the target action includes a combination of a performed action and a correction action as specified based on a corrective second user command. In one instance, the target action includes a performed action (e.g., when no corrective command is received). These sensor-target action data sets can be used to identify a relationship between sensor data and target actions and thereby to define a policy.

In another instance, a distinction can be identified between sensor data preceding a corrective command and other sensor data. An existing policy can be modified to differentiation between the sensor data.

Figure 5:
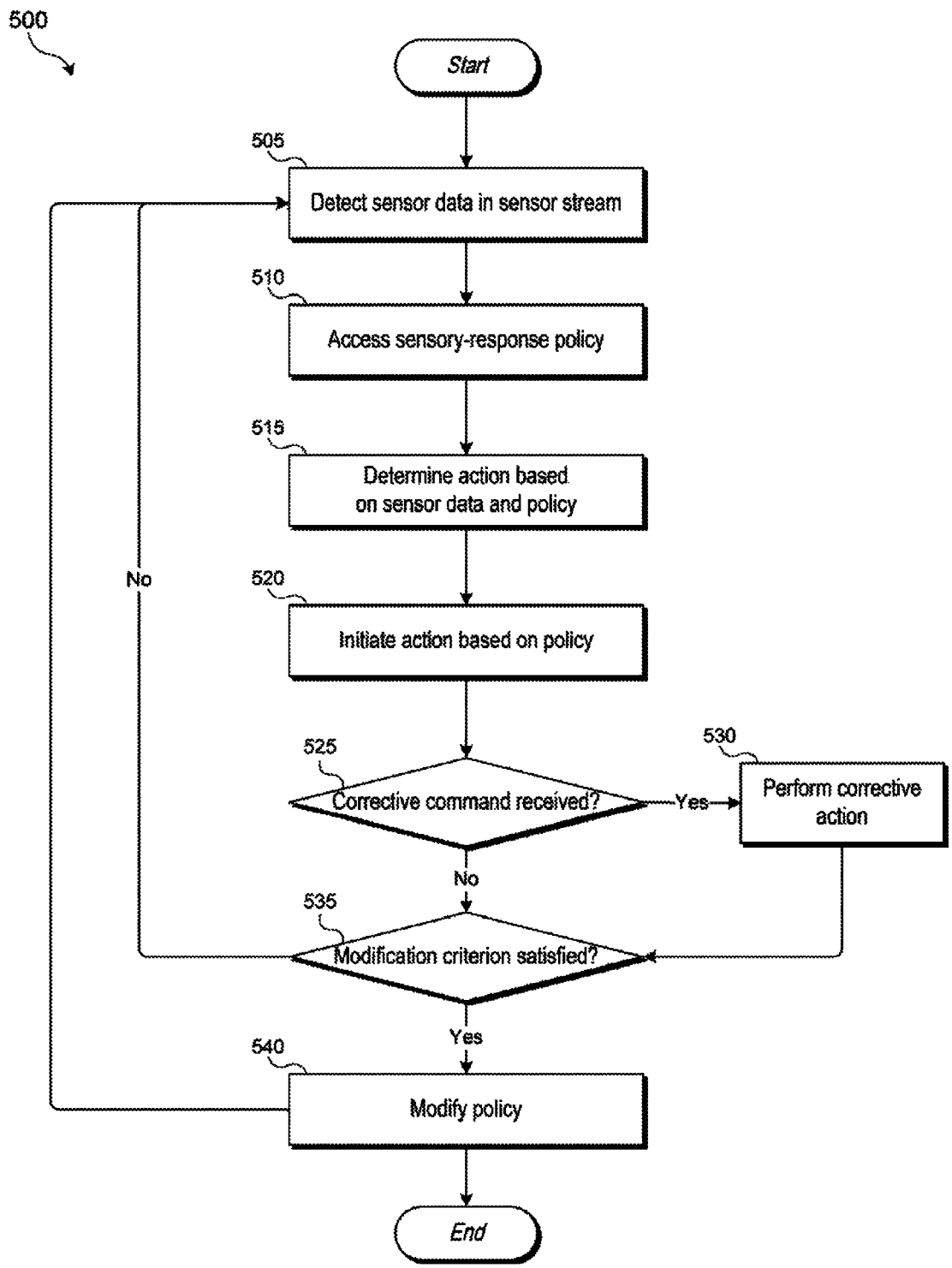
FIG. 5 is a flow diagram of a process for processing sensor data using a policy to determine an appropriate robot response according to an implementation of the present invention.

FIG. 5 is a flow diagram of a process 500 for processing sensor data using a policy to determine an appropriate robot response according to an implementation of the present invention. Part or all of process 500 can be implemented in a robot, a user device or a remote server. Process 500 begins at block 505 where data is collected from one or more sensors At block 510, a sensory-response policy is accessed. The sensory-response policy can include an initial policy and/or one previously refined based on received corrective commands (or lack thereof). In some implementations, the policy is determined by an algorithm with one or more parameters (e.g., an artificial neural network, a random forest, a support vector machine, a restricted Boltzmann machine, ridge regression, etc.). The policy can include one locally stored at a robot and/or one received from another policy-maintenance device (e.g., a sensory-response policy 224 stored on storage subsystem 204, as shown in FIG. 2).

At block 515, an action is determined based on the sensor data. In some instances, sensor data is initially pre-processed before analyzing it using the accessed sensory-response policy. The pre-processing can include processing to reduce or eliminate noise (e.g., to extract characteristics from an image that are more invariant to nuisance parameters, such as lighting and background) and/or to amplify characteristics presumed to be indicative of relevant attributes in the environment (e.g. an object of interest, its properties and location). Alternately, raw sensory data map be transformed into a collection of sensory maps (e.g., the data may be embedded into a similarity space, such as the location in a scene with respect to a robot's gaze, and/or the transformation may group similar reoccurring and co-occurring patterns), together referred to as sensory data in block 505. In some instances, a dimensionality of sensor data can be condensed (e.g., using a clustering technique, component analysis or correlation analysis). Sensory data may be transformed into a state that facilitates learning (e.g. collections of values may be represented as radial basis functions, either represented independently or jointly). The pre-processing that is performed, in some instances, is influenced by what type of data is to be evaluated based on the accessed policy. Thus, for example, if a policy is to identify an appropriate action based on an optic flow of an image, the pre-processing can include determining an image's optic flow.

Raw and/or pre-processed sensor data can then be evaluated using the policy to determine an appropriate action. The determination can include determining, e.g.: whether any action is to be performed, what type of action is to be performed (e.g., movement of an entire robot, moving an arm of a robot, pinching an object or releasing an object), a direction of a movement, a magnitude and/or speed of a movement and/or a duration of an action. The evaluation can include selecting (e.g., an action type or value) from amongst a continuum or from amongst a discrete list.

In one instance, a policy defines a network, such as an artificial neural network, that includes nodes, node connections (e.g., weighted connections) and/or constraints. Values corresponding to nodes in an input layer can be set based on raw or processed sensor-data values. Intermediate "hidden" nodes and inter-node connection weights can be used to translate these input-layer values into values for nodes in an output layer. Nodes of the output values can correspond to discrete actions, which can correspond to a high-level action (e.g., corresponding to a simultaneous or sequential set of discrete actions) or to specific, discrete actions. It will be appreciated that implementation of the policy need not utilize an artificial neural network. For example, it may instead rely on, e.g., a Bayesian model, a clustering algorithm or one or more if-then statements.

At block 520, the robot initiates performance of the action that was determined by the combination of the sensory data and the control policy. For example, one or more motor effectors can be activated with a speed or force that corresponds to the determined action.

At block 525, it can be determined whether a corrective command has been received (e.g., from a user device). This determination can be made (in various implementations) while the robot is performing the action and/or after the robot completes performance of the action and/or before the robot initiates the action, as anticipated by a user. The corrective command can specify a corrective action to perform. This corrective action can include a new action to perform (e.g., to partly or fully compensate for a previously performed action) or an instruction to cease a current action. In some instances, any command received (e.g., generally or after a training period) can be interpreted as a corrective command. Thus, even if a robot had not performed any recent action, a command can be corrective in that it instructs the robot to "correct" its inactive behavior by performing an action.

When it is determined that a corrective command was received, process 500 continues to block 530 where the robot performs a second action corresponding to the corrective command. This second action can include one differing from a current or planned action and/or partly or fully reversing the action performed at block 520. The second action can include one performed in place of part or all of the determined action or in addition to part or all of the determined action. For example, a determined action can be a 90-degree turn. While the robot is turning, the corrective command can indicate that the robot is to only turn 45-degrees or is to stop at a current rotation. Thus, the robot need not complete the full 90-degree turn.

Thus, it will be appreciated that in one instance, at block 520, a robot begins performing the determined action, but a corrective command indicates that the action to be performed is to differ from that determined at block 515. Thus, the robot can dynamically adjust its action (e.g., or even inaction) to match the corrective command. It will be appreciated that process 500 can thus include determining a corrective action corresponding to the corrective command, which can include a modification of the action determined at block 515 or an independent action.

In some instances, the corrective command is associated with a particular initial action performance and/or particular sensor-data variable(s). For example, the corrective command can be associated an action being performed when the corrective command was detected or an action most recently performed relative to the detection. The corrective command can then further be associated with sensor-data variables used to initially determine that action. In some instances, detection of the corrective command can be used as a basis for inferring that the performed action was not satisfactory to a user. An inference can further be made that the user instead preferred an action equal to a sum of the performed action and the corrective action. For example, if a robot component was initially rotated 135 degrees counter-clockwise and a corrective command indicated that the component was to rotate 45 degrees clockwise, it may be inferred that a desired action was a 90-degree counter-clockwise rotation.

At block 535, a determination is made as to whether a modification criterion is satisfied. The modification criterion can be pre-defined and/or generated based on user input. The modification criterion can indicate that a policy is to be evaluated for potential modification (or to be modified) when, e.g.: a corrective command was received, a corrective command specified an action of an above-threshold magnitude, a threshold number of corrective commands were received since a prior modification, an estimated user satisfaction level (e.g., estimated based on a number or frequency of corrective commands, affirmative approvals and/or actions not associated with user input) is below a threshold, a threshold period of time has passed since a recent (e.g., most recent) modification, and/or user input specifically requests policy modification, a user-designed context was designated for the purpose of one or more samples of paired motor states and sensory states (e.g., a sequence of robotic body poses are configured with respect to the sensory observation of previous poses). Thus, it will be appreciated that, in some instances, a corrective command need not initiate policy modification. For example, an inference or indication that a user approved of a performed action can be used as a basis for modifying a policy.

When it is determined that the modification criterion is satisfied, process 500 continues to block 540 where the policy is evaluated for modification and/or is modified. The modification can include updating one or more parameters (e.g., a weight, a threshold, or a constraint) in a policy and/or modifying a structure in a policy (e.g., adding, removing or modifying a node or connection in an artificial neural network, an if-then statement, etc.).

The modification can be based on one or more corrective actions, one or more inferences that a performed action was acceptable and/or one or more affirmative approvals of an action. In one instance, one or more sensory data variables are identified and are associated with a target action. The target action can be set to the initially performed action when no user response was detected or when user input approves the initial action. The target action can be set to a sum of a performed action and the corrective action when a corrective command was received. A set of these sensor-data and target-action pairings can be determined (e.g., corresponding to a specified number of most recently performed actions or those actions performed since a last modification). The pairings can then be used to modify the policy. In one instance, the pairings can be weighted (e.g., such that a higher weight is assigned to pairings generated based on corrective commands or affirmative approvals relative to weights assigned to pairings generated based on inferred approvals). In some instances, the pairings do not include ones based on inferred approvals and/or affirmative approvals. The modified policy (e.g., and/or modified parts of a policy) can be stored for subsequent use.

In some implementations, parameters of a control policy are updated proportional to the gradient of the parameter with respect to the error of the behavioral output. In some implementations, the users commands may be interpreted as absolute commands, and may over ride the output of the control policy. In such cases, the error can be the difference between the command the policy generated and the command that the user generated. In other cases, the commands can be interpreted as corrective commands, such that the commands themselves are defined to be the error, as indicated by the user. In some implementations, the parameters of the policy may be updated by a learning rule that is the product of the error term, a learning rate, and a scale factor proportional to estimated standard deviation of the sign of the previous updates for that parameter. In other implementations (e.g. multi-layer neural networks), additional procedures may be used to update parameters in a policy (e.g. back-propagation of error to each layer in a neural network).

When it is determined that the modification criterion is not satisfied at block 535 or after a policy's modification, process 500 returns to block 505. New sensor data can then be evaluated using the current policy.

Figure 6:
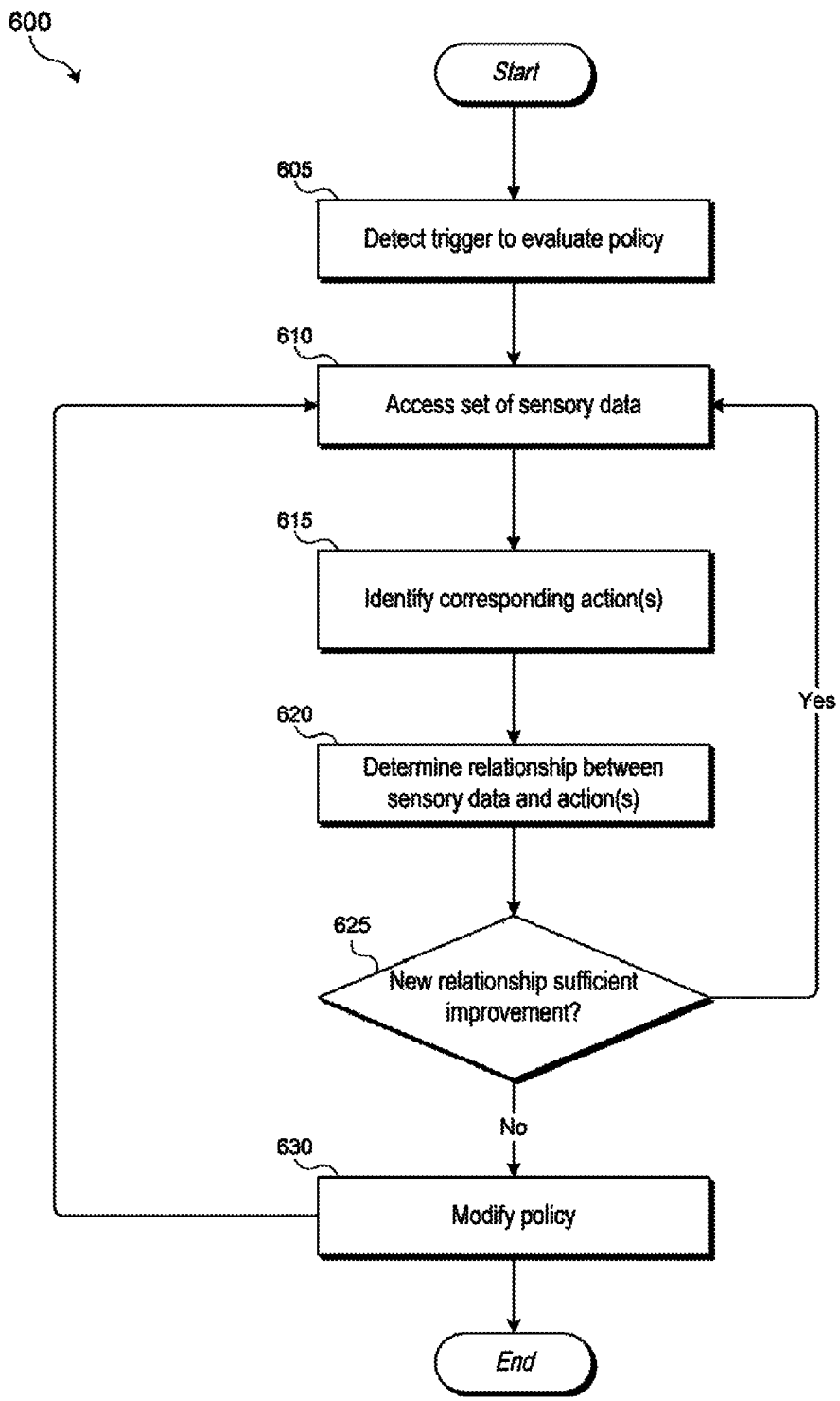
FIG. 6 is a flow diagram of a process for evaluating a robot sensory-response policy for possible modification according to an implementation of the present invention.

FIG. 6 is a flow diagram of a process 600 for evaluating a robot sensory-response policy for possible modification according to an implementation of the present invention. Part or all of process 600 can be implemented in a robot, a user device or a remote server. Process 600 begins at block 605 where a trigger to evaluate a policy is detected. This detection can include determining that specific conditions to evaluate a control policy are met. In some implementations, the trigger can be based on detection of a time or conclusion of a time period. For example, the policy may be adjusted at a defined rate (e.g., 1 Hz, 10 Hz, 30 Hz, 60 Hz, 100 Hz, 200 Hz, 500 Hz, 1000 Hz, etc.). In some implementations, the trigger relates to sensory data (e.g., that sensory data of a given type is available, that a change in sensory data of a given type is detected, etc.) and/or to resources (e.g., that a power and/or memory level crossed a threshold). The trigger may include performance of one or more (or a threshold number) of actions. The trigger may include detection of one or more (or a threshold number) of corrective commands. The trigger may be fixed or at least partly (or fully) definable by a user (e.g., to set an evaluation temporal frequency or threshold number of corrective commands to prompt evaluation).

Learning can happen iteratively upon arrival of sensory data. In other implementations, a trigger is sent to evaluate a much larger repository of sensory data, potentially not in real-time (e.g., once per minute, hour, day or week), acting on a batch of sensor data, or iterating over random subsets of a batch. The latter process has an advantage of computing error over one or more corrective commands in a batch, and may be able to generalize better to reach a stable optimum, potentially better for refining a policy. The former may learn faster and can be more desirable when a user shapes the behavior of a network by iteratively providing feedback with a series of policies, focusing on one error category at a time.

At block 610, a set of sensory data is accessed. The sensory data can include preprocessed (e.g. sensory algorithms) and/or transformed (e.g. radial basis functions) representations of the raw sensory data, as in block 505. A set may be composed of one or more samples from each relevant sensor source in a time range defined in relation to a trigger (e.g. the samples immediately preceding a trigger). Relevant sensor sources may include one or more and potentially all available robotic sensors, and the corresponding processed or transformed values of these sensors. A sensory data set may also include a timeseries of values from a sensor, or a transform of a recent timeseries (e.g. upon a trigger, the sensory data from an accelerometer may include the integral of the acceleration during the time period since the last trigger). The data may also include the corrective commands of one or more users (e.g., the sensory observation of the user completing a corrective command, either directly via the user interface, or indirectly from associated sensory data).

At block 615, one or more corresponding actions are identified. The corresponding actions can include, e.g., one or more actions actually performed by a robot, an action initially identified for performance based on sensor data, and/or an action corresponding to a corrective command. Thus, actions can include actions initially identified based on a current policy and/or actions defined based on corrective input. Generally, the action(s) can be used to infer which action(s) were acceptable to a user. For example, if the control policy had proposed to rotate a vehicle clockwise with an angular velocity of 3 degrees per second, and the user provides a corrective command of 3 degrees per second counter clockwise, it may be inferred that the desired action was to not rotate the vehicle at all. In other implementations, a control policy may act on one or more output motors (e.g., to rotate a vehicle clockwise, a head counter clockwise, and a move eyes upward), and a corrective command may act upon one or more motors (e.g. a corrective command to move the eyes downward). It can be appreciated that the inferred desired action may be determined from a recent history of proposed actions, and a recent history or corrective commands.

In some implementations, the inference may take into account the latency of a user's response with respect to the initiation of a salient robotic action, in order to ascertain the desired mapping of from the sensory data at the time preceding the salient action, to the delayed corrective user command. For example, when a user presses a button to correct a robotic action, a predicable amount of time may have elapsed between a robot initiating an action, and the user responding to it (e.g. 300-600 msec to perceive and press a button). During this time, the robot could have completed more actions. Thus, the user's response was probably not regarding the most recent robotic action, but an action preceding that (e.g. 600 msec ago), and the relevant sensory data for the control policy may precede that (e.g. 600-900 msec ago).

It can be appreciated a user may also provide corrective commands for predictions of errors (e.g. to turn before a robot collides with a wall, because the current trajectory does not account for it). Thus, corrective commands are not strictly for modeling past actions, but also may serve as corrections of anticipated actions. A user may continuously provide a stream of corrective commands (e.g., the angle of a joystick captured at 50 Hz), and these user commands may be predictive of the corrective command required at a future moment in time. For example, the user may be able to tell the vehicle is not turning to avoid a future obstacle (e.g. by assuming the robots past behavior of not turning is predictive if its future behavior of not turning) and the user could proceed to provide a corrective command to turn at the subsequent moment in time. At that time of signal combination, the control signal from the existing control policy (e.g. of not turning in the given context) may be combined with the user's corrective command (e.g. to turn), resulting in a turn that avoids a future collision.

At block 620, a relationship between the sensory data and the corresponding action(s) is determined. In some implementations the relationship is estimated by iteratively applying changes to the control policy based on samples of sensory motor-pairs that occurred (e.g. the preceding sensory data and the previous action). Updates to the policy may be achieved by changing parameters to algorithm, such that a representation of similar sensory data will yield similar motor responses. In some implementations, a parameter may be incremented or decremented by a learning rule (e.g. based on the product of the magnitude of values in a vector, constituting a recent sensory representation, and a target vector). In other implementations, the learning rule updates parameters based on the gradient of the error of a target action (e.g. back-propagation) as determined by the difference between an action specified by an existing control policy and action specified by the combination of a corrective command and the control policy. In other implementations of determining the relationship between sensory data and actions, updates to parameters may include the additional product of a scalar factor (e.g., a learning rate), the addition of a momentum term (e.g., inducing a consistent direction of change based on past applications of a parameter update), and/or the addition of a noise term (e.g. allowing a parameter to drift according to a diffusion process).

In some implementations, the process 620 of determining the relationship between the sensory data and motor response may include a prior of the smoothness (e.g., a Gaussian process), and discontinuity (e.g., a Dirichlet process) in the target control policy. The process may include a estimated parameter of the threshold of error necessary to induce a user to provide a corrective behavior, simultaneously attempting to construct a model of the target policy and the user's corrective behavior that maximizes the likelihood of the users observed corrections, given the sensory data and the control policy at each moment in time. For example, when the user does not respond, this provides evidence that the target policy is not discernably different from the used policy, and when the user does respond, this provides evidence that the used policy was substantially different from the target policy in at least one aspect (e.g., the aspect indicated by the corrective command).

At block 625, it is assessed whether the determined relationship is a sufficient improvement over an existing policy. If the sensory data reliably predicts the corresponding action, then the system may converge on a set of parameters that predict the desired outcome. In some implementations, if learning is enabled, all determined relationships to sensory data may be deemed a sufficient improvement, resulting in a modification of the policy for each action. In such cases, the magnitude of the change may be influenced by a scalar factor (e.g. relating the importance, as assessed by a cost function, task rewards, or the assessment of preceding actions). In other implementations, candidate changes to the control policy may only be deemed a sufficient improvement if accompanied by a corrective command in the sensory data. In other implementations, changes in the control policy may be deemed a sufficient if the score in an external test is passed (e.g. the re-evaluation of a cost function associated with a sensory motor policy remains higher than a threshold). If some or part of the sensory data does not predict the desired action, then the gradient of the parameter with respect to the error may fluctuate with the variability of the sensory data, potentially suppressing the updates of the parameter, and thus avoiding the undesirable behavioral variability associated with generating false associations in the sensory data, and/or speeding up learning time. In some implementations, the suppression of the magnitude of the updates of a parameter may be accomplished by reducing the learning rate by a running estimate of the standard deviation of the sign of the error gradient for each parameter in the recent past.

The relationship between the sensory data and the desired action can be measured by determining the parameters of a control policy that minimize the error of the action inferred and the action proposed by the control policy. One can appreciate that minimizing this error relates to minimizing the incidence and magnitude of corrective commands (e.g., if an algorithm achieved perfect alignment with what a user wanted, there would be no need to provide corrective commands). In some implementations, a new control policy may be generated based on a single new pairing of sensory data to inferred desired action, plus the similar sensory contexts that should provide similar motor responses. To ascertain if the new control policy sufficiently captures a relationship, errors may be computed upon previously observed sensory motor pairs (e.g. broad generalization may impoverished what was learned in a similar sensory context with different desired motor response). In some implementations, most proposed modifications of the policy may be accepted during initial learning, but the criteria for acceptance (e.g., a reduction of error for previously observed sensory motor pairs) may become more stringent, or the magnitude of the allowed change may be reduced with learning (e.g. as approximated by time, or number of learning instances, or a performance score). The similarity of the sensory context and motor context which is affected by the proposed change to the control policy, may be determined beforehand (e.g. a fixed Gaussian width of impact in a sensory map or a motor map) or for each case (e.g. a range of widths may be tested, allowing for a broad or narrow sensory or motor generalization).

Choosing whether or not to incorporate a newly proposed change to the existing control policy may involve assessing whether the new control policy would decreases the error. This selection of a new control policy may also include other terms involved in optimizing the entire search process. Since solutions are not guaranteed to be convex, during a stochastic iterative search it may be necessary to consider some proposed parameter changes which increase the error. For example, this may be done by including momentum terms, or noise terms, along with following the gradient of the error. Alternate loss functions (e.g., cross entropy, hinge loss) and additional techniques (e.g., simulated annealing) may be applied, as would be familiar to a person trained in the art.

At block 630, the sensory-response control policy is modified. In one implementation, modification may be performed by updating the parameters of the algorithm (e.g. coefficients) or parameters of the network (e.g. the weights of edges between nodes), which implements the control policy. In another implementation, a genetic algorithm may modify a process that governs an algorithm at a meta-level (e.g. by changing the topology of a network, or a normalization method). In another implementation, a graphical model with hyper-parameters over model parameters is chosen to fit the data of observed sensory data and the user's corrective commands.

Figure 7:
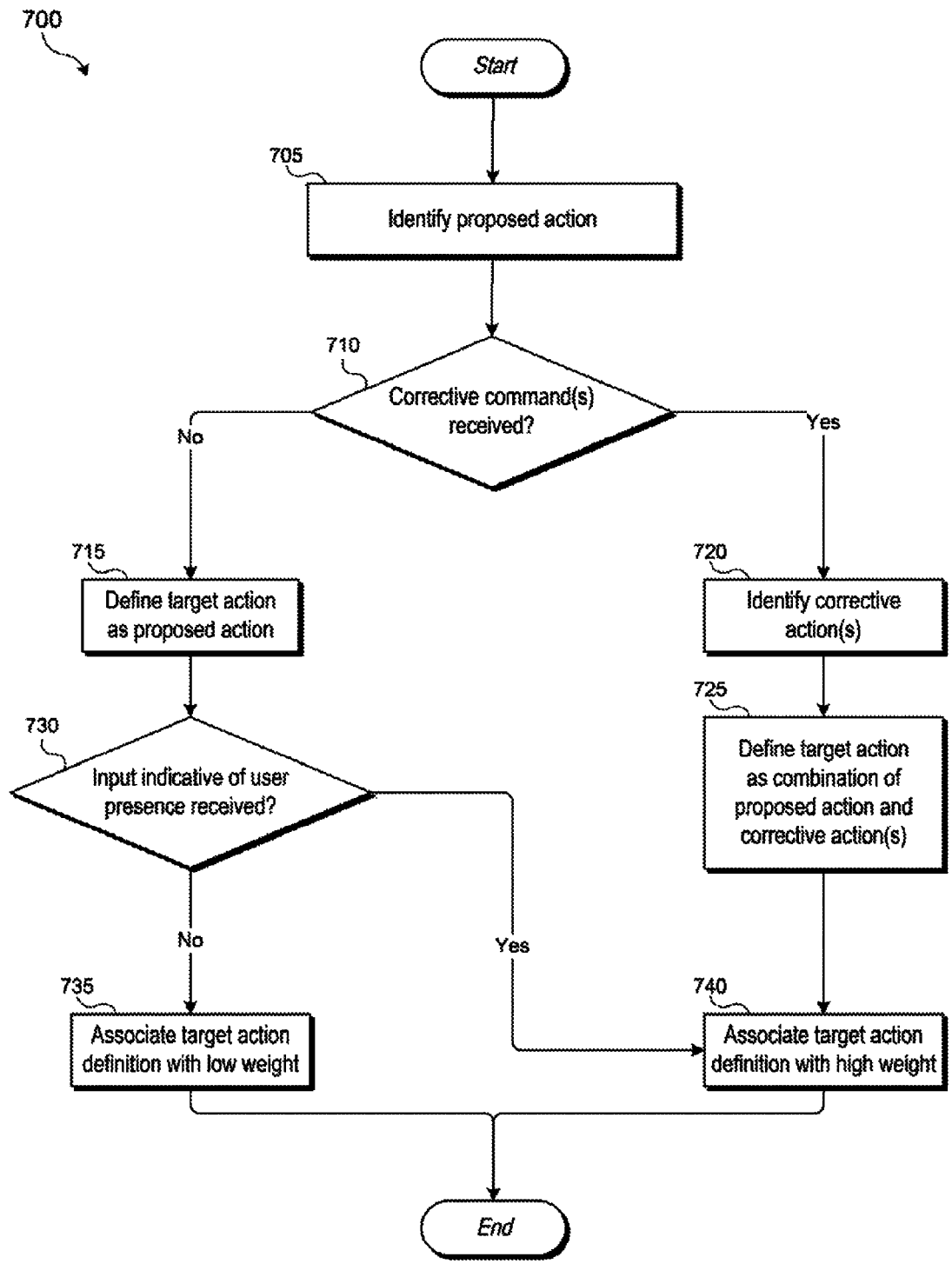
FIG. 7 is a flow diagram of a process for identifying a target action for a robot based on presence or absence of a user corrective command according to an implementation of the present invention.

FIG. 7 is a flow diagram of a process 700 for identifying a target action for a robot based on presence or absence of a user corrective command according to an implementation of the present invention. Part or all of process 700 can be implemented in a robot, a user device or a remote server.

Process 700 begins at block 705 where a proposed action is identified. The proposed action can include one initially identified by evaluating a policy using sensory data. A proposed action may be the set of changes in joint angles that will achieve a target force at some, one or all joints (e.g. that the elbow should extend 1 degree and that the wrist should rotate clockwise 4 degrees). A proposed action may be a target velocity (e.g. 0.2 m/sec) or a target acceleration (e.g., 0.1 m/sec^2) for one or more motor outputs. A proposed action may be to displace the robots position (e.g., to back up 10 feet).

At block 710 it is determined whether or not an unapplied corrective command was received. If there are no corrective commands, then process 710 continues to infer 715 that the proposed action is the desired action. If there is a corrective command, then 720 continues to identify the corrective action.

At block 720, the corrective action(s) are identified. In some implementations, corrective commands may have a direct mapping to an effector (e.g. the velocity of a motor). In other implementations, a command may be relative to some other contextual state (e.g., for the robot to approach a target, which may not be in front of it) and/or may impact many effectors (e.g. the corrective command increase a quadrupedal gate, which may involve the coordinated response of many effectors). One, some or all unapplied corrective actions may be applied at each time step (e.g. summating, or overriding previous corrective commands). In some implementations, or depending on the context, a set of all unapplied corrective actions may be summed (e.g., two corrective commands to back up ten feet may be combined into a single command to back up twenty feet). In other implementations, or depending on the context, a most recent corrective action may be selected (e.g., a sequence of unapplied corrective commands to increase the velocity by 2 m/s, then 3 m/s, then 4 m/s may select the corrective command to increase the velocity to 4 m/sec). In some implementations, desired actions are communicated as a set point for a lower level controller (e.g., a PID control loop that maintains position, force, acceleration, etc.)

At block 725, the desired action is inferred to be a combination of the proposed action and the corrective actions(s). The combination of the proposed action and the corrective actions may be their sum. As can be appreciated, the requirement of a sum necessitates a numerical representation of an action with a value. In some implementations, non-additive operators may be used, such as logical operators (e.g. actions may be treated as binary operators (e.g., true or false), allowing for the appropriate logical operator to be selected (e.g. a logical "and" or logical "or")); multiplicative operators (e.g., the corrective command acts as a multiplicative gain of the action); or operators that select the corrective action as the desired action.

At block 740, the target action is associated with a high weight. The high weight may be used to have a greater impact on subsequent potential changes in the control policy (e.g. by multiplying the proposed change in the policy's parameters by the associated weight, or by rejecting changes to the policy if the associated weight is below a threshold). In can be appreciated that subsequent processes may act upon, increment, decrement, or transform this weight, but that processes 735 and 740 may be used to establish an initial difference in the weight. Additionally, it can be appreciated that the magnitude of the high weight may differ based on the result of process 710, and the details of 730.

At block 715, which occurs when no corrective command is received from a user, the target action is defined as being equal to the proposed action. The meaning of this definition can be made clear by considering that the user had the opportunity to correct the target action, but made no such correction, implying tacit approval. In some implementations, the user's commands may be quick, discrete events (e.g. a button press), and the presence or absence of a user command may impact a region of time near the command (e.g., 200 msec after the user provides a corrective command). Consequently, even if the user is paying attention to the robot's task, the absence of correction for a brief interval may not constitute approval of that interval, as user corrective commands may be generated periodically with some spacing between them (e.g., a button press every 500 msec).

At block 730, it is determined if there was an input that was indicative that the user was present. In one implementation, the user's recent activity on a control interface (e.g. a smart phone app, a browser interface, a tablet, a remote control, or an executable software application) would indicate that the user is present. Additional sources of evidence from the sensors on a user interface (e.g., accelerometer, camera) and/or from the sensors on a robot (e.g. motion sensor, face detection, gaze estimation, touch or proximity sensor) may be used to determine if a user was present. It can also be appreciated that this evidence may go beyond determining if a user was present, including an estimate that the user was actively attending to the robot's task. In the later case, the system may infer that the users chose not to correct the robot, and use the lack of a correction is considered as a tacit agreement that the robotic behavior was desired. In such cases, process 730 may proceed to processes 740 and associate a high weight with the target action definition. On the other hand, in the absence of evidence that the user is present and attending to the task (or if there is evidence that the user is not attending to the task), then control proceeds to block 735.

At block 735, the target action definition is associated with a low weight. This low weight indicates that a the relationship between the robots sensory data and the subsequent action was likely not approved by the user. In some implementations, the weight may be so low that subsequent potential modifications of the policy (e.g. process 600) will result in no change, because the associated weight is below a threshold. In can be appreciated that the details of block 730, may result in a range of weights (e.g., a weight may be the negative exponent of a Boltzmann distribution, defining a probability or confidence), allowing for a continuum between low weights in 735 and high weights in 740.

Figure 8:
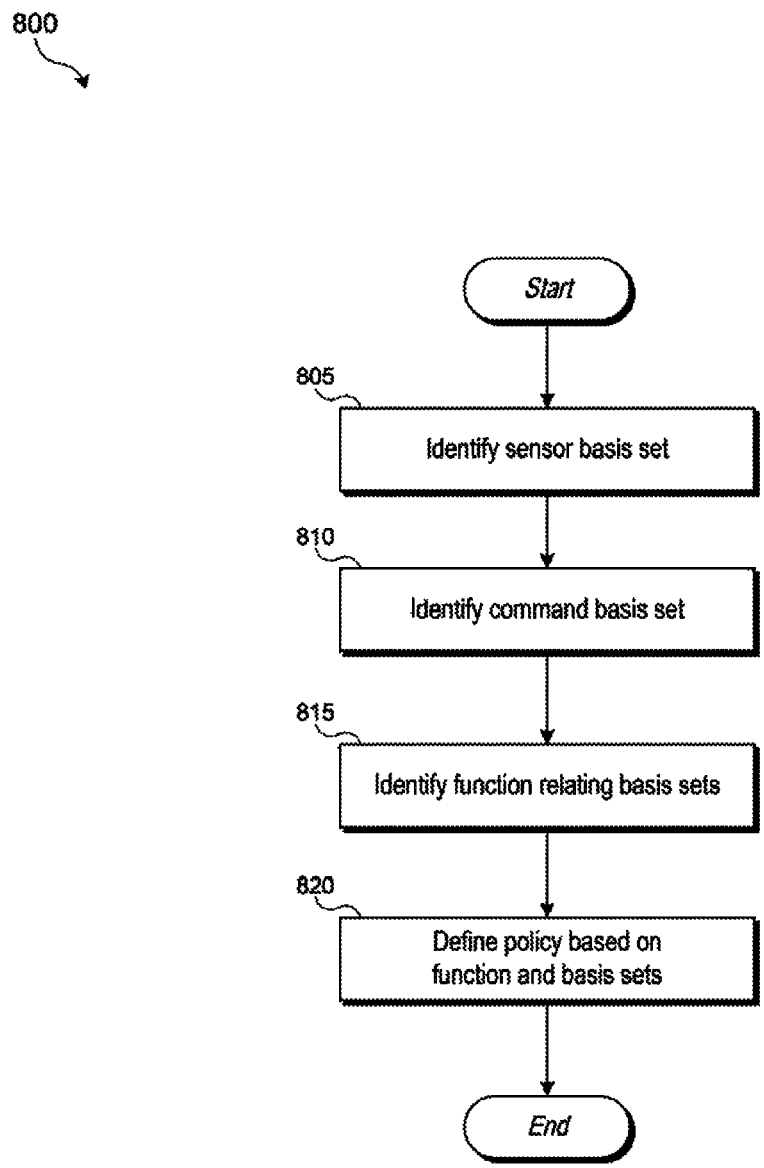
FIG. 8 is a flow diagram of a process for defining a policy using basis sets according to an implementation of the present invention.

FIG. 8 is a flow diagram of a process 800 for defining a policy using basis sets according to an implementation of the present invention. Part or all of process 800 can be implemented in a robot, a user device or a remote server. Process 800 begins at block 805 where a sensor basis set is identified.

At block 805, a sensor basis is identified, that is, a transform of the raw sensory data into a sensor basis. For example, raw sensor data may be pixels from one or more cameras, audio from a one or more microphones, time series data from one or more electromyograms, etc. In some implementations, a sensory basis may be consistent with a basis in linear algebra: a linearly independent spanning set of the raw data. In other implementations, the basis may be the result of one or more linear or non-linear transforms of the raw data, which may be compressed, may not be invertible, and may not span the space. A visual basis may also be the output of a hierarchy of visual features encoding either raw pixel values, or supra-threshold video wavelets filters, or some other filters. A sensor basis may be the result of a sensory computational pipeline. The components of the pipeline (e.g. the linear component of a video wavelet), may be optimized for the task and environment of the robot (e.g. by encoding the set of videos, or other sensor data, in a task-relevant database). A sensor basis may independently span a space within a unique sensory source (e.g. images from a camera, sounds from a microphone, initial measurements from an IMU) or across sources (e.g., combining data from multiple cameras, or combining data from cameras and microphones and IMUS, etc.) For example, a time-extending data stream can be condensed along a time dimension (e.g., to represent a maximum amplitude and/or signal variation), or sensor data spanning multiple modalities (sound, sight, acceleration, etc.) can be condensed across the modalities (e.g., by projecting onto linear filters that span these streams or detecting times of time-locked events of above-threshold or high variation across data streams). Sensory data may be processed by hierarchies of nodes in a network (e.g. performing linear weighted operations along edge in a network and a potentially non-linear functions with each node in the network).

At block 810, a command basis is identified, that is, a transform of the raw action commands data into a command basis. For example, raw command data may be voltages sent to actuators, a time series of the derivative of values sent to set points controlling the joint forces of a robot, etc. A command basis provides a new representation of raw commands. In principle it may span the same space, but it may also enable the system to generalize better, such that similar commands have similar representations. A command basis may be identified by a component analysis of past commands (e.g., an analysis of the independent components of a database of commands corresponding to known good behavior, and/or known common mistakes in the training process, potentially from the same robot, and potentially from the same task).

At block 815, a function is identified that relates the command basis set to the sensor basis set. The function relating the basis sets maps an input sensor state to an output command state (e.g., a graphical model, a Bayesian model, an energy model, a Boltzmann machine, a Gaussian process, a support vector machine, a liquid state machine, a polynomial regression, a single layer perceptron, a multilayer perceptron, a fern, a random forest, a biologically inspired software model of the cerebellum or cortex or other brain area, or a method that infers the input-output mapping of a function, given a set of input-output pairs, and/or a set of assumptions about the input, or some combination thereof).

At block 820, a control policy is defined that provides a map from raw sensor data to raw commands, relying on the sensor basis, the command basis, and the function between these bases. Changes to the policy (e.g. when the policy is modified 630) may involve modifying the function mapping between the bases, but need not change the basis themselves. Changes to the policy may change the bases as well; however, between the sensor basis, the motor basis, and the function relating them, the changes may be applied at different timescales (e.g., the changes may be applied faster or slower, with greater or lesser impact per modification) or with different permanence (e.g., the changes may decay or persist over varying durations).

It will be appreciated that disclosures herein referring to a robotic action can, in some implementations, also be applied to digital actions (e.g. the posting of a photo; the rating of a topic, establishment or service).

It will be appreciated that disclosures herein referring to a corrective commands can, in some implementations, also include facial expressions (e.g. a grimace, a furrowed brow, a smile) or social communications (e.g. an engaged body posture, the location and duration of a user's gaze, a hand gesture) or the manipulation of the robots body (e.g., the positioning of a robots join angle to indicate that a particular pose, or postural sequence should be obtained; touch contact with a robots body potentially indicating a location and moment of error and/or a change in behavior that would reduce the error).

As robots become more prevalent in society, it will be increasingly more important how we indicate the user's intent of a task to be performed. In the long run, the field may establish protocols of natural human interaction, capable of guiding robotic behavior. However, it is daunting to create a software solution with a complete understanding of the environment, the consequences of actions, the social dynamics of people, and the intentions of a user. A powerful step in facilitating human-robotic interaction is to provide a platform with a consistent interface for users, and that will scale with the computational resources of robotics. We propose a framework of corrective commands, that enable a user to intuitively indicate what a robot should do in real time. The user's understanding of the world can provide a behavioral scaffolding; the user's understanding of the environment, the consequences of actions, the social dynamics of people, and their own intentions will become embedded in the behavioral dynamics of the robot. Importantly, we describe a software solution, tailored to the corrective commands of users, capable of learning a mapping form the robots sensory environment to the commands it should generate. Not only can a human user correct robotic errors in real time, but the results of past corrective commands can be leveraged to learn the correct behavior.

Implementations of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the implementations described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

What is claimed is:

1. A method for performing robot actions by a robot, the method comprising:
   defining a policy comprising a plurality of parameters for determining robot actions based at least in part on sensory-data inputs, the defining of the policy comprising mapping the sensory-data inputs to robot actions;
   receiving a first sensory-data input from a sensor;
   performing a first robot action at a first action time, wherein the first robot action is determined based at least in part on the first sensory-data input and application of the policy;

determining that a user input was received at an input time corresponding to the first action time, wherein a corrective command at least partially derived from the user input specifies a corrective robot action for physical performance, the user input being indicative of at least partial dissatisfaction with the first robot action; and modifying the policy based on the corrective command and the first sensory-data input.

2. The method of claim 1, further comprising determining a second robot action at a second action time, wherein the second robot action is based at least in part on the modified policy and a second sensory-data input from the sensor.

3. The method of claim 1, wherein the modifying of the policy further comprises using a learning model.

4. The method of claim 1, wherein the at least partial dissatisfaction includes a discrepancy between a target robot action and the first robot action.

5. The method of claim 1, wherein the modifying of the policy comprises changing parameters relating sensory-data inputs to actuator responses that correspond to robot actions.

6. The method of claim 3, wherein the learning model includes updating parameters based on a gradient of error determined at least in part by a difference between the first robot action and a second robot action specified by a combination of the corrective command and the policy.

7. The method of claim 1, further comprising determining a first context-variable value for a context variable, wherein the first context-variable value is determined from the first sensory-data input and the policy is further determined based at least in part on the context variable.

8. A robot, comprising:
an actuator configured to perform robot actions for robotic tasks;
a sensor configured to detect an environmental context of the robot and generate sensory-data inputs; and
a processor apparatus configured to:
define a policy comprising a plurality of parameters configured to determine robot actions based at least in part on sensory-data inputs;
determine that a user input was received at an input time corresponding to a performance of a first robot action corresponding to a detection of a first sensory-data input;
generate a corrective command at least partially derived from the user input, the user input being indicative of at least partial dissatisfaction with the first robot action, and
modify the policy based on the corrective command and the first sensory-data input.

9. The robot of claim 8, further comprising a user interface configured to receive the user input.

10. The robot of claim 8, wherein the at least partial dissatisfaction includes a discrepancy between a target robot action and the first robot action.

11. The robot of claim 8, wherein the modification of the policy further comprises usage of a learning model.

12. The robot of claim 8, wherein the processor apparatus is further configured to determine a first context-variable value for a context variable, wherein the first context-variable value is determined from the first sensory-data input and the policy is further determined based at least in part on the context variable.

13. The robot of claim 8, wherein the sensor is at least one of a light sensor, a motion detector, an inertial measurement unit, and a global positioning system receiver.

14. A non-transitory computer-readable storage medium having a plurality of instructions stored thereon, the instructions being executable by a processing apparatus to operate a robot, the instructions configured to, when executed by the processing apparatus, cause the processing apparatus to:
define a policy comprising a plurality of parameters configured to determine robot actions based at least in part on sensory-data inputs, wherein the policy maps the sensory-data inputs to robot actions;
receive a first sensory-data input;
perform a first robot action at a first action time, wherein the first action is determined based at least in part on the first sensory-data input and application of the policy;
determine that a user input was received at an input time corresponding to the first action time, wherein a corrective command at least partially derived from the user input specifies a corrective robot action for physical performance, the user input being indicative of at least partial dissatisfaction with the first robot action; and
modify the policy based on the corrective command and the first sensory-data input.

15. The non-transitory computer-readable storage medium of claim 14, wherein the instructions are further configured to, when executed by the processing apparatus, determine a second robot action at a second action time, wherein the second robot action is based at least in part on the modified policy and a second sensory-data input.

16. The non-transitory computer-readable storage medium of claim 14, wherein the modification of the policy further comprises usage of a learning model.

17. The non-transitory computer-readable storage medium of claim 14, wherein the instructions are further configured to, when executed by the processing apparatus, assess whether the modified policy comprises an improvement over the policy prior to modification, the improvement being determined by a threshold being exceeded.

18. The non-transitory computer-readable storage medium of claim 14, wherein the modification of the policy comprises changing parameters relating sensory-data inputs to actuator responses that correspond to robot actions.

19. The non-transitory computer-readable storage medium of claim 16, wherein the learning model includes updating parameters based on a gradient of error determined at least in part by a difference between the first robot action and a second robot action specified by a combination of the corrective command and the policy.

20. The non-transitory computer-readable storage medium of claim 14, wherein the instructions are further configured to, when executed by the processing apparatus, determine a first context-variable value for a context variable, wherein the first context-variable value is determined from the first sensory-data input and the policy is further determined based at least in part on the context variable.

21. The non-transitory computer-readable storage medium of claim 14, wherein the at least partial dissatisfaction includes a discrepancy between a target robot action and the first robot action.

* * * * *